United States Patent
Raj

(10) Patent No.: US 9,613,439 B1
(45) Date of Patent: Apr. 4, 2017

(54) SYSTEM AND METHOD FOR A HIERARCHICAL BAYESIAN-MAP APPROACH FOR SOLVING INVERSE PROBLEMS

(71) Applicant: The United States of America, as represented by the Secretary of the Navy, Washington, DC (US)

(72) Inventor: Raghu G. Raj, Fairfax, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/884,841

(22) Filed: Oct. 16, 2015

(51) Int. Cl.
 *G06K 9/36* (2006.01)
 *G06T 11/00* (2006.01)

(52) U.S. Cl.
 CPC .......... *G06T 11/005* (2013.01); *G06T 11/006* (2013.01)

(58) Field of Classification Search
 CPC ....... G06T 9/00; G06T 11/005; G06T 11/006; G06T 7/0051; G06T 7/0083; G06T 7/0012; G06T 7/0024; G06T 7/0081; G06T 11/00–11/008; G06T 2200/04; G06T 2207/10072–2207/10112; G06T 2211/00–2211/436; H04N 5/335; H04N 5/3415; H04N 19/105; H04N 19/12; H04N 19/132; H04N 19/59; H04N 19/63; H04N 5/225; H04N 13/00; H04N 19/00; G02B 26/0833; G01R 33/5608; G01R 33/5611;
 (Continued)

(56) References Cited

U.S. PATENT DOCUMENTS 6,950,492 B2 * 9/2005 Besson .................. A61B 6/508
  378/16
6,950,493 B2 * 9/2005 Besson .................. A61B 6/508
  378/16

(Continued)

OTHER PUBLICATIONS

Fira et al., "On Projection Matrices and Dictionaries in ECG Compressive Sensing—a Comparative Study", 2014 12th Symposium of Neural Network Applications in Electrical Engineering (NEUREL) School of Electrical Engineering, University of Belgrade, Nov. 25-27, 2014.*

(Continued)

*Primary Examiner* — Jose Couso
(74) *Attorney, Agent, or Firm* — US Naval Research Laboratory; Suresh Koshy

(57) ABSTRACT

A method of reconstructing an image of an object, the method including: determining, by a plurality of sensors, a waveform based on the object, wherein the plurality of sensors view the object from a plurality of directions; determining, by a pre-processing module, a plurality of measurements of the object using the waveform, wherein the plurality of measurements are arranged in a vector form; determining, by an option module, a sampling matrix, a dictionary, and a noise factor, wherein the sampling matrix represents a geometric arrangement of the plurality of sensors, and the dictionary is pre-selected by the option module; estimating, by an estimation module, a coefficient vector using the measurements, the sampling matrix, and the noise factor; and reconstructing, by a reconstruction module, the image, using the coefficient vector and the dictionary.

21 Claims, 12 Drawing Sheets

(58) Field of Classification Search
CPC .......... G01R 33/56308; G01R 33/4824; G06K 9/4652; G01S 13/0209; A61B 6/025; A61B 6/032; A61B 6/03–6/037; A61B 8/13–8/15; Y10S 8/901
See application file for complete search history.

(56) References Cited

U.S. PATENT DOCUMENTS

| | | | | |
|---|---|---|---|---|
| 7,283,231 | B2 * | 10/2007 | Brady | G06T 9/00 356/303 |
| 7,394,251 | B2 * | 7/2008 | Lin | G01R 33/4824 324/307 |
| 8,538,329 | B2 * | 9/2013 | Beadle | H04B 1/0025 341/122 |
| 8,860,835 | B2 * | 10/2014 | Kelly | G02B 26/0833 348/222.1 |
| 8,861,588 | B2 * | 10/2014 | Nguyen | G01S 13/0209 341/155 |
| 9,474,495 | B2 * | 10/2016 | Ahn | G01T 1/1603 |
| 2011/0142316 | A1 * | 6/2011 | Wang | G06T 11/006 382/131 |

OTHER PUBLICATIONS

Raj et al., "A Hierarchical Bayesian-Map Approach to Computational Imaging", 2014 IEEE Conference on Image Processing (ICIP), Oct. 27-30, 2014.*

Needell et al., CoSaMP: Iterative signal recovery from incomplete and inaccurate samples, Applied and Computational Harmonic Analysis, Jan. 31, 2008, pp. 301-321, vol. 26, Elsevier, Amsterdam, Netherlands.

Kim et al., An Interior-Point Method for Large-scale $\xi_1$-Regularized Least Squares, IEEE Journal of Selected Topics in Signal Processing, Dec. 2007, pp. 606-617, vol. 1, No. 4, IEEE, Piscataway, USA.

Ji et al., Bayesian Compressive Sensing, IEEE Journal of Selected Topics in Signal Processing, Jun. 2008, pp. 2346-2356, vol. 56, No. 6, IEEE, Piscataway, USA.

* cited by examiner

SYSTEM AND METHOD FOR A HIERARCHICAL BAYESIAN-MAP APPROACH FOR SOLVING INVERSE PROBLEMS

GOVERNMENT INTEREST

The embodiments described herein may be manufactured, used, and/or licensed by or for the United States Government without the payment of royalties thereon.

BACKGROUND

Technical Field

The embodiments herein relate to imaging, and more particularly to reconstructing images using one or more sensors.

Description of the Related Art

Imaging refers to a class of inverse problems wherein the central objective is to form the image of an object or scene of interest that is typically being sensed by one more sensors each furnishing complementary but correlated sources of information, and each of which is potentially contaminated by noise and distortion. What distinguishes this from the more general class of inverse and regression problems is that images originating from typical empirical sources (such as natural images) have a special structure that makes it possible to inject informed prior models into the inference process that can enhance the quality of the reconstructed image. Accordingly, a wide variety of analytical and statistical approaches have proliferated over the past several decades in diverse imaging applications such as radar, medical, and astronomical imaging.

SUMMARY

In view of the foregoing, an embodiment herein provides a method of reconstructing an image of an object, the method comprising: determining, by a plurality of sensors, a waveform based on the object, wherein the plurality of sensors view the object from a plurality of directions; determining, by a pre-processing module, a plurality of measurements of the object using the waveform, wherein the plurality of measurements are arranged in a vector form; determining, by an option module, a sampling matrix, a dictionary, and a noise factor, wherein the sampling matrix represents a geometric arrangement of the plurality of sensors, and the dictionary is pre-selected by the option module; estimating, by an estimation module, a coefficient vector using the measurements, the sampling matrix, and the noise factor; and reconstructing, by a reconstruction module, the image, using the coefficient vector and the dictionary.

The estimating the coefficient vector may comprise computing, by a first variable module: a first variable, using a pre-selected non-linear factor; and a multi-scale Gaussian tree structure, using a quad-tree decomposition of the image, the sampling matrix, the dictionary, and the measurements. Estimating the coefficient vectors may further comprise: estimating, by a parameter module, a structural parameter based on a parent-child relationship for each node in the tree structure; repeating, by a loop module: the computing of the first variable and the multi-scale Gaussian tree structure, and the estimating of the structural parameter, across the tree structure, until the structural parameter is lower than a first pre-selected threshold. The estimating the coefficient vectors may thrther comprise: computing, by a second variable module, a second variable based on the first variable, the sampling matrix, a variable selection operator, and a second pre-selected threshold; and computing, by a coefficient module, the coefficient vector based on a Hadamard product of the first variable and the second variable.

Estimating the coefficient vector may comprise: initializing, by the estimation module, $x^0 = |h^{-1}(\Psi^T y)|$ and $n=0$, wherein $x^0$ is an initial approximation of a temporary parameter, h is a nonlinear factor, $\Psi$ is the sampling matrix, y is a vector comprising the measurements, and n is a loop counter; calculating, by the estimation module, a descent direction $d^n$; determining, by the estimation module, a step size $\lambda$; and computing, by the estimation module, $x^{n+1} = x^n + \lambda d^n$, wherein $x^n$ is an $n^{th}$ approximation for the temporary variable and $x^{n+1}$ is an $(n+1)^{th}$ approximation for the temporary variable.

The method may further comprise: incrementing, by the estimation module, the loop counter n; computing, by the estimation module, $x^*$, by repeating the calculating the descent direction $d^n$, the determining the step size $\lambda$, the computing $x^{n+1}$, and the incrementing the loop counter n until a norm of a steepest descent vector is smaller than a pre-selected threshold, wherein $x^*$ is a temporary variable. The method may further comprise: computing, by the estimation module, $z^* = h(x^*)$; calculating, by the estimation module, $\bar{\Lambda}_L = \text{diag}(S_\lambda[z^*])$ and $\Lambda_R = \text{diag}(z^*)$, where $$S_\lambda[z(i)] = \begin{cases} 1 & z(i) > \lambda \\ 0 & z(i) \leq \lambda \end{cases};$$

calculating, by the estimation module, $u^* = L^{-1}R$ where $L = \bar{\Lambda}_L(\Psi^T \Sigma_\nu^{-1}\Psi + \Lambda_L^{-1}\Sigma_u^{-1}\Lambda_L^{-1})\Lambda_R$ and $R = \mathbb{R}\, \Psi^T \Sigma_\nu^{-1}$ where $\nu \in \mathbb{R}^m$ is the noise factor; and calculating, by the estimation module, $c^* = \odot u^*$ where $c^* \in \mathbb{R}^n$ is the coefficient vector. Reconstructing the image may further comprise: calculating, by the reconstruction module, $I = \Phi c^*$ where $I \in \mathbb{R}^n$ is the reconstructed image and $\Phi \in \mathbb{R}^{d \times n}$ is the pre-selected dictionary. The plurality of sensors may be independent from each other, wherein the dictionary may comprise at least one class of wavelet dictionaries, and wherein the sampling matrix may comprise a sampling operator determined by a transmitted waveform associated with the measurements and the geometric arrangement of the plurality of sensors.

Another embodiment herein provides an imaging device comprising: a plurality of sensors configured to generate a waveform based on an object; a pre-processor configured to determine a plurality of measurements using the waveform, wherein the plurality of measurements are arranged in a vector form; and a central imaging device comprising: an option module configured to determine a sampling matrix, a pre-selected dictionary, a pre-selected non-linear factor, a first pre selected threshold, a second pre-selected threshold, and a noise factor, wherein option module determines the sampling matrix using a geometric arrangement of the plurality of sensors; an estimation module configured to estimate a coefficient vector using the plurality of measurements, the sampling matrix, and the pre-selected dictionary; and a reconstruction module configured to reconstruct an image of the object, using the coefficient vector and the pre-selected dictionary.

The estimation module may further comprise: a first variable module configured to: compute a first variable using a pre-selected non-linear factor; and determine a multi-scale Gaussian tree structure using a quad-tree decomposition of the electronic source image model, the sampling matrix, the pre-selected dictionary, and the measurements. The estimation module may further comprise: a parameter module configured to determine a structural parameter using a parent-child relationship for each node in the multi-scale Gaussian tree structure; and a loop module configured to control operation of the first variable module and the parameter module across the multi-scale Gaussian tree structure until the structural parameter is lower than the first pre-selected threshold. The device may further comprise: a second variable module configured to determine a second variable using the first variable, the sampling matrix, the variable selection operator and the second pre-selected threshold; and a coefficient module configured to determine the coefficient vector using a Hadamard product of the first variable and the second variable.

The estimation module may be further configured to: initialize $x^0 = |h^{31\ 1}(\Psi^T y)|$ and n=0, wherein $x^0$ is an initial approximation of a temporary parameter, h is a nonlinear factor, $\Psi$ is the sampling matrix, y is a vector comprising the measurements, and n is a loop counter; calculate a descent direction $d^n$; determine a step size $\lambda$; and compute $x^{n+1} = x^n + \lambda d^n$, wherein $x^n$ is an $n^{th}$ approximation for the temporary variable and $x^{n+1}$ is an or $(n+1)^{th}$ approximation for the temporary variable. The estimation module may be further configured to: increment the loop counter n; compute x* by repeating the calculating the descent direction $d^n$, the determining the step size $\lambda$, the computing $x^{n+}$, and the incrementing the loop counter n until a norm of a steepest descent vector is smaller than a pre-selected threshold. The estimation module may be further configured to: compute z*=h (x*); calculate $\bar{\Lambda}_L = \text{diag}(S_\lambda[z^*])$ and $\Lambda_R = \text{diag}(z^*)$ where $$S_\lambda[z(i)] = \begin{cases} 1 & z(i) > \lambda \\ 0 & z(i) \le \lambda \end{cases};$$

calculate $u^* = L^{-1}R$ where $L = \bar{\Lambda}_L (\tilde{\Psi}^T \Sigma_v^{-1} \tilde{\Psi} + \Lambda_L^{-1} \Sigma_u^{-1} \Lambda_L^{-1}) \Lambda_R$ and $R = \bar{\Lambda}_L \tilde{\Psi}^T \Sigma_v^{-1}$ where $v \in \mathbb{R}^m$ is the noise factor; and calculate $c^* = z^* \odot u^*$ where $c^* \in \mathbb{R}^n$ is the coefficient vector. The reconstruction module may be further configured to reconstruct the image by calculating $I = \Phi c^*$ where $I \in \mathbb{R}^n$ is the reconstructed image and $\Phi \in \mathbb{R}^{d \times n}$ is the pre-selected dictionary.

Another embodiment provides a non-transitory program storage device readable by computer, tangibly embodying a program of instructions executable by the computer to perform a method for reconstructing an image of an object, the method comprising: detemining, by a plurality of sensors, a waveform based on the object, wherein the plurality of sensors view the object from a plurality of directions; determining, by a pre-processing module, a plurality of measurements of the object using the waveform, wherein the plurality of measurements are arranged in a vector form; determining, by an option module, a sampling matrix, a dictionary, and a noise factor, wherein the sampling matrix represents a geometric arrangement of the plurality of sensors, and the dictionary is pre-selected by the option module; estimating, by an estimation module, a coefficient vector using the measurements, the sampling matrix, and the noise factor; and reconstructing, by a reconstruction module, the image, using the coefficient vector and the dictionary.

Estimating the coefficient vector may comprise computing, by a first variable module a first variable, using a pre-selected non-linear factor; and a multi-scale Gaussian tree structure, using a quad-tree decomposition of the image, the sampling matrix, the dictionary, and the measurements. Estimating the coefficient vectors may further comprise: estimating, by a parameter module, a structural parameter based on a parent-child relationship for each node in the tree structure; repeating, by a loop module: the computing of the first variable and the multi-scale Gaussian tree structure, and the estimating of the structural parameter, across the tree structure, until the structural parameter is lower than a first pre-selected threshold. Reconstructing the image may further comprise using global compound Gaussian model as a statistical prior. Reconstructing the image may further comprise using hierarchical Bayesian maximum a posteriori and using global compound Gaussian model as a statistical prior.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

Figure 1:
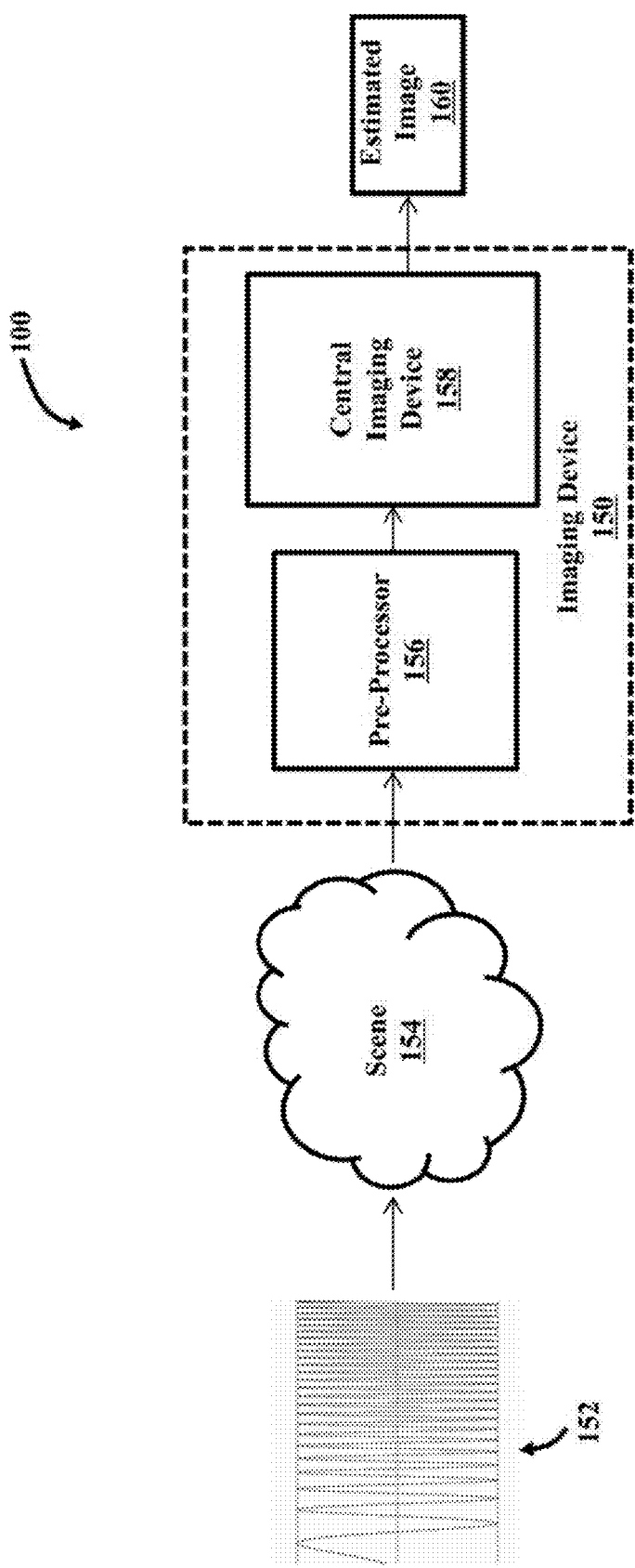
FIG. 1 is a schematic diagram illustrating a an imaging system, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a Hierarchical Bayesian-MAP (Maximum a Posteriori) method for solving inverse problems. An embodiment herein reconstructs an image that is viewed from multiple directions by independent sensors, subject to a global Compound Gaussian (CG) prior placed on the signal to be estimated. An embodiment herein approaches this inverse problem in imaging based on a Hierarchical Bayesian-MAP (HB-MAP) formulation. An embodiment herein describes the basic inverse problem of multi-sensor (tomographic) imaging. Given the measurements recorded by the sensors, a problem may be reconstructing the image with a high degree of fidelity. An embodiment uses a Probabilistic Graphical Modeling extension of the CG distribution as a global image prior into a Hierarchical Bayesian inference procedure. In an embodiment, the global CG model incorporated within the HB-MAP inference procedure is used for solving inverse problems and imaging. The HB-MAP algorithm solves a difficult non-convex optimization problem. The Monte-Carlo simulations, described herein, show that that this approach works for over a broad range of conditions—high and low sparsity cases—whereas Comprehensive Sensing (CS) and sparsity based approaches work only for high-sparsity cases. An embodiment herein provides a way to utilize the global CG model which subsumes the Laplacian—the basis of compressive sensing and many other statistical models—for solving, difficult inverse problems such as imaging. An embodiment herein represents a numerical-technological advancement to realize the application of global CG models for imaging in practice. Embodiments herein can be used for radar imaging (SAR, ISAR etc.), medical imaging, and a broad class of inverse problems involving empirically derived data sources.

Referring now to the drawings, and more particularly to FIGS. 1 through 12, where similar reference characters denote corresponding features consistently throughout the figures, there are shown preferred embodiments.

FIG. 1 is a schematic diagram illustrating an imaging system 100 according to an embodiment herein. Imaging system 100 may include imaging device 150 that receives the signals resulting from the reflection of waveforms 152 (transmitted and received at diverse sensing angles) from object/scene of interest 154. Imaging system 100 can also include pre-processor 156 that conditions the signals by factoring out signal variations that are due to various systemic factors. Pre-processor 156 produces data that is processed by central imaging device 158 to generate estimated image 160. Pre-processor 156 can encapsulate much of the system- and domain-level expertise associated with the application domain of interest. For example, in radar imaging, typical pre-processing steps can include pulse compression (generalized matched filtering) and range alignment (which corrects for the different time delays associated with the transmission of pulse sequences through the propagation media) which collectively ensure that the effective system can be approximately modeled as a linear shift-invariant transformation-thus rendering the resulting signals amenable to efficient Fourier analysis tools.

An embodiment herein provides optimum image reconstruction conditioned on the aforementioned pre-processing operations. An effective forward model can be captured by the following linear system model:

$$y = \Psi\Phi c + v \quad (1)$$

where:
$y \in \mathbb{R}^m$ is the measurements in vector form,
$\Psi \in \mathbb{R}^{m \times d}$ is the effective measurement matrix,
$I = \Phi c \in \mathbb{R}^n$ is the vectorized image of interest,
$\Phi \in \mathbb{R}^{d \times n}$ is the dictionary in which one may choose to represent the unknown image I,
$c \in \mathbb{R}^n$ is the unknown coefficient vector which is the object of the inference methodology,
and
$v \in \mathbb{R}^m$ is the effective measurement noise.

An embodiment herein solves equation (1) by estimating the coefficient vector c given the observed measurements y. The dictionary $\Phi$, with respect to which the image is represented, is chosen a priori and can be, for example, but not limited to, any class of wavelet dictionaries. The dictionary can also be a member of a more general class of over-complete dictionaries. Embodiments herein can be applied to any type of sampling operator $\Psi$, for example, but not limited to, the Radon transform which underlies some imaging applications. In practice, the matrix $\Psi$ may be determined by both the transmitted waveform and the geometric arrangement of the sensors in space and time.

Different approaches may be used to solve for c in Eq. (1). For imaging applications, the traditional approach is the Filtered Back-projection (FBP) methodology (Deans) wherein the underlying dictionary $\Phi$ includes Fourier atoms. A variety of Compressive-Sensing (CS)/Sparsity-based-reconstruction approaches including Large-Scale l1-Regularized Least Squares (l1-ls), Orthogonal Matching Pursuit (OMP), Regularized Orthogonal Matching Pursuit (ROMP), Iterative signal recovery from incomplete and inaccurate samples (CoSaMP), and Bayesian Compressive Sensing (BCS) have been applied for this purpose. An embodiment herein encompasses CS and sparse reconstruction approaches and treat them as special cases.

From Eq. (1) an embodiment herein provides a Bayesian-Maximum a posteriori (MAP) estimate of c. The prefix "Bayesian" emphasizes that probabilities in embodiments herein are assigned without a corresponding notion of sampling or frequency. Furthermore an embodiment herein produces covariance estimates which could be used to determine confidence intervals.

The Bayesian-MAP estimate of c is given as follows:

$$c^* = \mathrm{argmax}_c \log P(c|y) \propto \quad (2)$$

$$\mathrm{argmax}_c \{\log P(y|c) + \log P(c)\} \quad (3)$$

$$= \mathrm{argmin}_c \{\|y - \Psi\Phi c\|_2^2 - \log P(c)\} \quad (4)$$

where, in Eq. (4) $v \sim \mathcal{N}(0, \Sigma_v = 1)$.

The distribution P(c) encapsulates the statistical prior knowledge about the scene structure. For the specific choice of a Laplacian (i.e. $P(c) = \exp(-\lambda\|c\|_1)$), Eq. (2) reduces to the LASSO methodology or the Basis Pursuit methodology:

$$c^* = \mathrm{argmin}_c\{\|y - \Psi\Phi c\|2/2 + \lambda\|c\|_1\} \quad (5)$$

The Laplacian distribution is not sufficiently rich for modeling the statistics of wavelet coefficients of natural scenes when sensed by optical or radar sensors. In an embodiment herein, a probabilistic graphical modeling extension of the Compound Gaussian (CG) distribution is used as a candidate for P(c). This extension subsumes distributions such as, for example, but not limited to, the Laplacian, the generalized Gaussian, and the alpha-stable distribution.

The Bayesian-MAP estimation problem, under the CG modeling, lends itself to a Hierarchical Bayes formulation that can yield superior performance to traditional CS methodologies. In Bayesian statistics, a maximum a posteriori probability (MAP) estimate is a mode of the posterior distribution. The MAP can be used to obtain a point estimate of an unobserved quantity on the basis of empirical data. It is closely related to Fisher's method of maximum likelihood (ML), but employs an augmented optimization objective which incorporates a prior distribution over the quantity one wants to estimate.

In Eq. (1), c can be modeled as a random vector that can be decomposed into the following Hadamard product form:

$$c = z \odot u \quad (6)$$

such that:
i) $u \sim \mathcal{N}(0, P_u)$
   $z = h(x)$
x follows a Multi-scale Gaussian Tree structure
ii) u and z are independent random variables
iii) $\mathbb{E}[z^2] = 1$
iv) h is a non-linearity (which ultimately controls the sparse structure of c).

Figure 2:
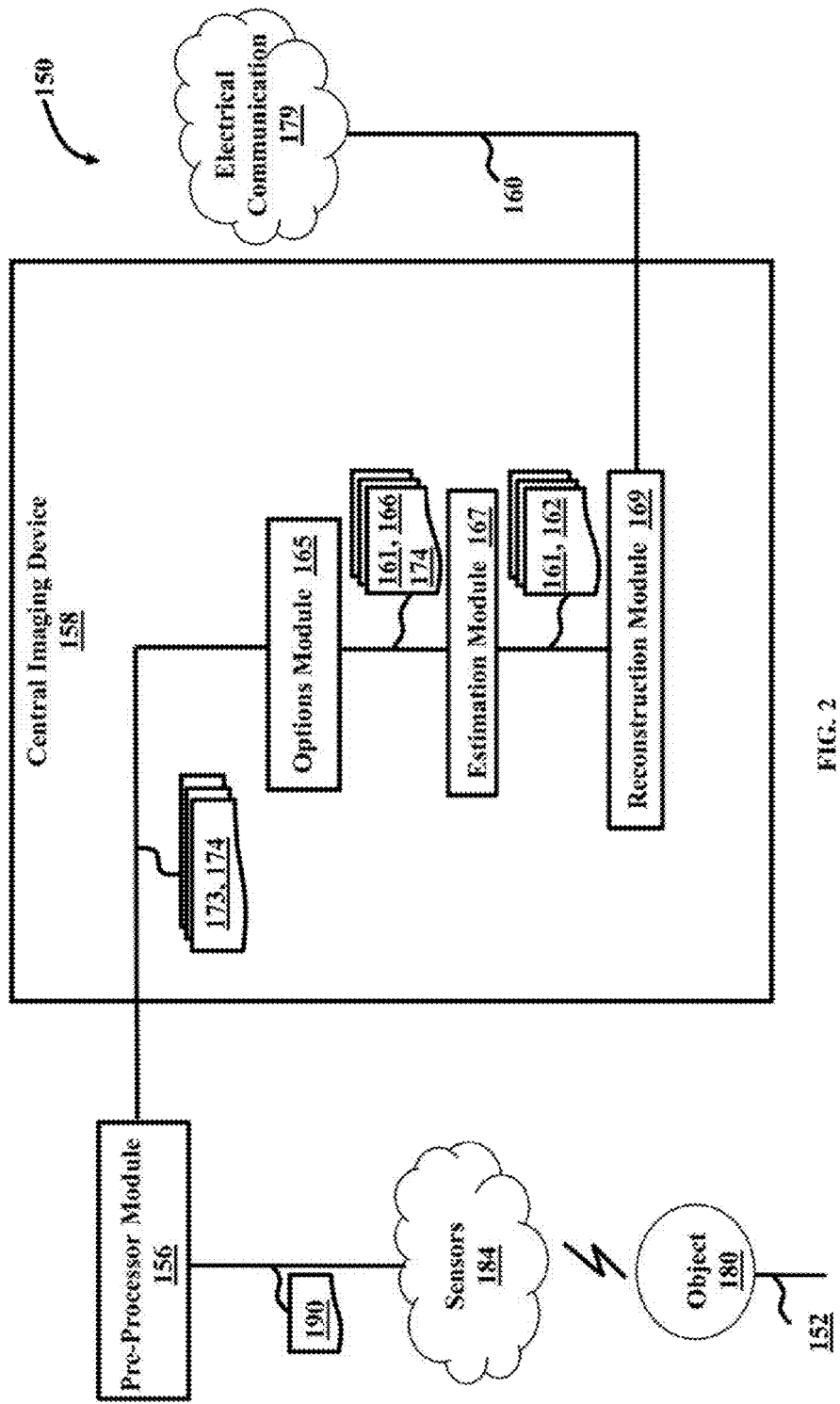
FIG. 2 is a schematic block diagram illustrating an imaging device, according to an embodiment herein.

FIG. 2, with reference to FIG. 1, is a schematic diagram illustrating the imaging device 150 for reconstructing an electronic source image of the target that is viewed by independent sensors, according to an embodiment herein. In an embodiment, imaging device 150 includes sensors 184 configured to generate the waveforms 152 based on an object 180. In an embodiment, imaging device 150 includes the pre-processor 156 and the central imaging device 158. Pre-processor 156 processes the backscattered waveforms 190 and furnishes the resulting measurements to the central imaging device 150. The pre-processor 156 is further configured to determine measurements 174 of the object/scene being sensed. Measurements 174 may be in a vector form.

The measurements 174 may be in a vector form. Imaging device 150 may also include options module 165 configured to determine a sampling matrix 173, a pre-selected dictionary 161, and a noise factor 166. Sampling matrix 173 can be based on a geometric arrangement of sensors 184 collecting data of an object 180. Imaging device 150 may further include estimation module 167 configured to estimate coefficient vector 162 based on measurements 174, sampling matrix 173, pre-selected dictionary 161, and noise factor 166.

Imaging device 150 may further include reconstruction module 169 configured to prepare, a reconstructed image 160 from the measurements 174. In an embodiment, reconstruction module 169 uses any of dictionary 161 and estimated coefficient vector 162 to generate the reconstructed image 160. In an embodiment, dictionary 161 may include at least one class of wavelet dictionaries. Sampling matrix 173 may include a sampling operator determined by the transmitted waveform 152 associated with measurements 174 and the geometric arrangement of the independent sensors 184. Reconstructed image 160 may be transmitted by an electrical communication module 179.

Figure 3:
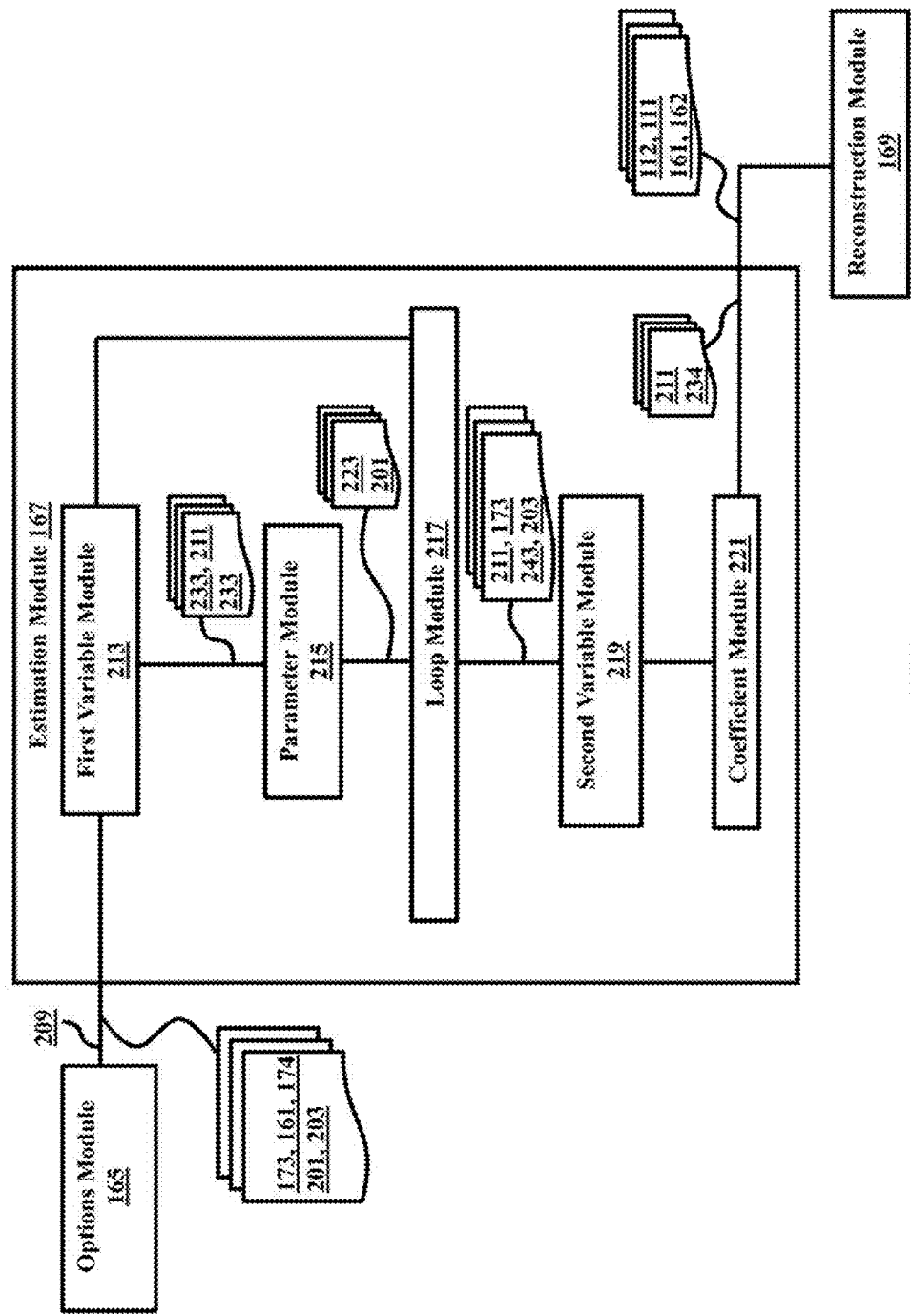
FIG. 3 is a schematic block diagram illustrating an imaging device, according to an embodiment herein.

FIG. 3, with reference to FIGS. 1 through 2, is a schematic diagram illustrating the options module 165, the estimation module 167, and the reconstruction module 169, according to an embodiment herein. In an embodiment, estimation module 167 includes first variable module 213 configured to compute a first variable 211 based on a pre-selected non-linear factor 209. In an embodiment, options module 165 determines the pre-selected non-linear factor 209. Options module 165 may further be configured to determine a first pre-selected threshold 201 and a second pre-selected threshold 203. In an embodiment, first variable module 213 is further configured to determine a multi-scale Gaussian tree structure 233 using a quad-tree decomposition of the electronic source image model of the object/scene being sensed, the sampling matrix 173, the pre-selected dictionary 161, and the measurements 174.

In an embodiment, the estimation module 167 may also include the parameter module 215 configured to determine a structural parameter 223 using a parent-child relationship for each node in the tree structure 233. The estimation module 217 may further include a loop module 217 configured to control operation of the first variable module 213 and the parameter module 215 across the tree structure 233 until the structural parameter 223 is lower than the first pre-selected threshold 201. Estimation module 167 may further include a second variable module 219 configured to determine a second variable 234 using the first variable 211, sampling matrix 173, variable selection operator 243, and the second pre-selected threshold 203. Estimation module 167 may also include a coefficient module 221 configured to determine coefficient vector 162 based on a Hadamard product of the first variable 211 and the second variable 234.

In an embodiment, estimation module 167 may be configured to (a) initialize $x^0 = |h^{-1}(\Psi^T y)|$ and n=0, where h is the non-linear factor 209, $\Psi \in \mathbb{R}^{m \times d}$ is the sampling matrix 173, $y \in \mathbb{R}^m$ are the measurements 174, and n is a loop counter; (b) calculating a descent direction $d^n$; (c) determining a step size $\lambda$; (d) computing $x^{n+1} = x^n + \lambda d^n$; (e) incrementing the loop counter n; (f) computing x* by repeating steps (b) through (e) until a norm of a steepest descent vector is smaller than the first pre-selected threshold 201; (g) computing $z^* = h(x^*)$; (h) calculating $\bar{\Lambda}_L = \text{diag}(S_\Lambda |z^*|)$ and $\Lambda_R = \text{diag}(z^*)$, where $$S_\lambda[z(i)] = \begin{cases} 1 & z(i) > \lambda \\ 0 & z(i) \leq \lambda \end{cases};$$

(i) calculating $u^* = L^{-1} R$, where $L = \bar{\Lambda}_L (\tilde{\Psi}^T \Sigma_v^{-1} \tilde{\Psi} + \Lambda_L^{-1} \Sigma_u^{-1} \Lambda_L^{-1}) \Lambda_R$ and $R = \bar{\Lambda}_L \tilde{\Psi}^T \Sigma_v^{-1}$ where $v \in \mathbb{R}^m$ is the noise factor 166; and (j) calculating $c^* = z^* \odot u^*$ where $c^* \in \mathbb{R}^n$ is the coefficient vector 162.

In an embodiment, the reconstruction module 169 is further configured to reconstruct the image by calculating. $I = \Phi c^*$ where $I \in \mathbb{R}^n$ is the reconstructed image, and $\Phi \in \mathbb{R}^{d \times n}$ is the pre-selected dictionary 161.

Figure 4:
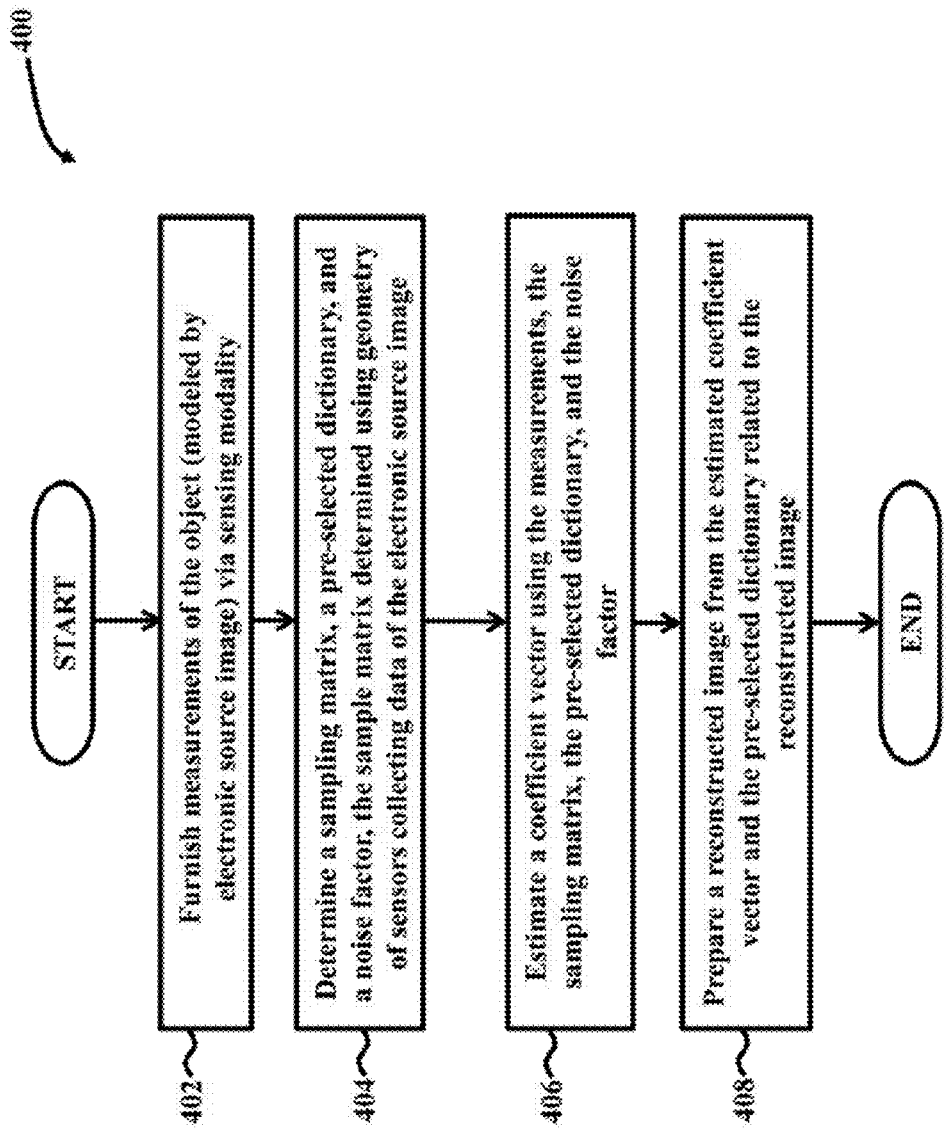
FIG. 4 is a flowchart illustrating a method, according to an embodiment herein.

FIG. 4, with reference to FIGS. 1 through 3, is a flow diagram illustrating a method 400 for reconstructing an image of an object, according to an embodiment. At step 402, method 400 furnishes, via sensing modality, measurements 174 of object 180 (modeled the global CG model) viewed by sensors 156. In an embodiment, sensors 156 are independent from each other. In an embodiment, the image modeling module 163 models the object 180 be imaged. At step 404, method 400 determines the sampling matrix 173, the pre-selected dictionary 161, and the noise factor 166. In an embodiment, the sample matrix is determined using a geometric arrangement of sensors 156 collecting data of the object/scene being sensed. In an embodiment, option module 165 determines the sampling matrix 173, the pre-selected dictionary 161, and the noise factor 166. In step 406, method 400 estimates the coefficient vector 162 using the measurements 174, the sampling matrix 173, the pre-selected dictionary 161, and the noise factor 166. In an embodiment, the estimation module 167 determines the coefficient vector 162. At step 408, method 400 prepares a reconstructed image from the estimated coefficient vector 162 and the pre-selected dictionary 161 related to the reconstructed image. In an embodiment, method 400 prepares the reconstructed image from the measurements 174, using the estimated coefficient vector 162 and the pre-selected dictionary 161 related to the reconstructed image. In an embodiment, the reconstruction module 169 prepares the reconstructed image.

Figure 5:
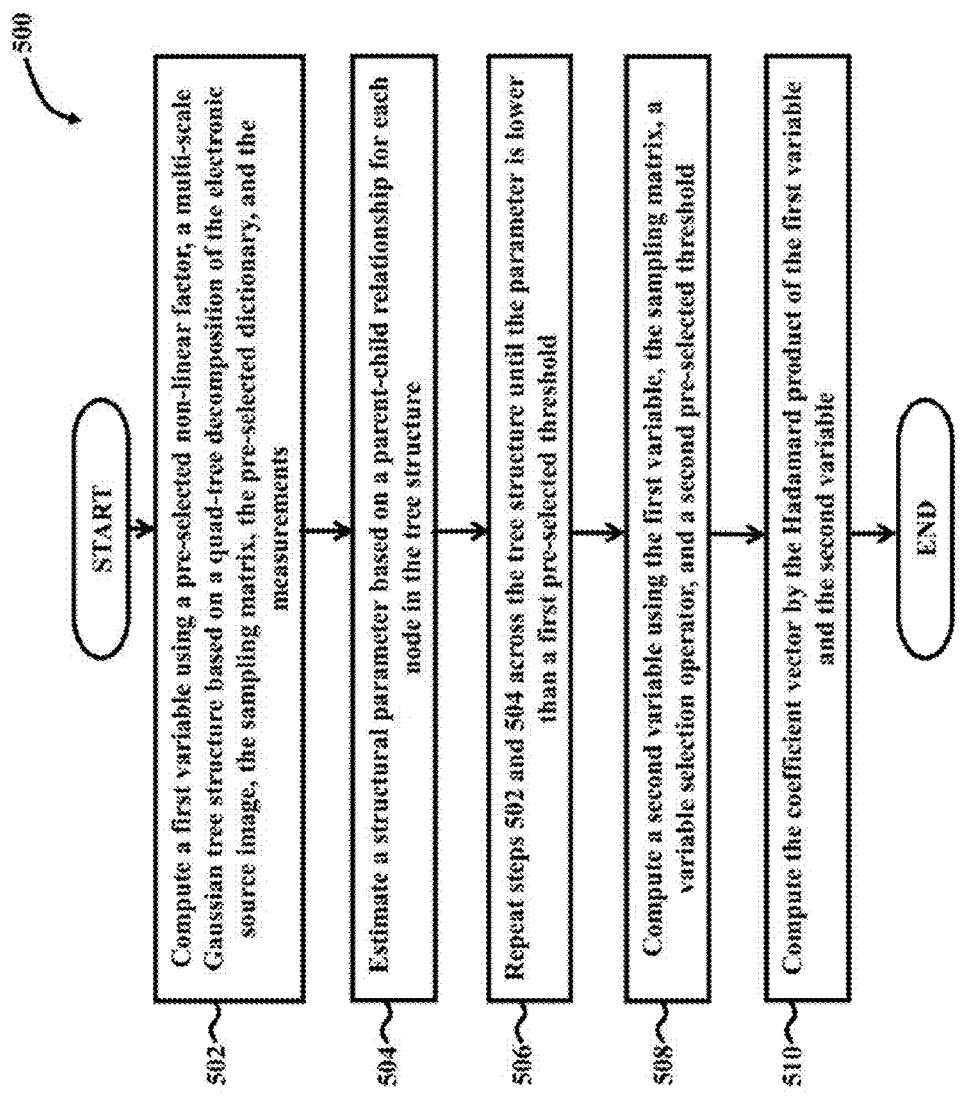
FIG. 5 is a flowchart illustrating a method, according to an embodiment herein.

FIG. 5, with reference to FIGS. 1 through 4, is a flowchart illustrating a method for computing the coefficient vector 162, according to an embodiment. At step 502, method 500 computes the first variable 211 using the pre-selected non-linear factor 209, the multi-scale Gaussian tree structure 233 using a quad-tree decomposition of the electronic source image model of the object/scene being sensed, the sampling matrix 173, the pre-selected dictionary 161, and the measurements 174. In an embodiment the measurements 174 are in vector form. In an embodiment, the first variable module 213 computes the first variable 211 and determines the multi-scale Gaussian tree structure 233. At step 504, method 500 estimates the structural parameter 223 based on a parent-child relationship for each node in the tree structure. In an embodiment, the parameter module 215 determines the structural parameter 223.

At step 506, method 500 repeats steps 502 and 504 across the tree structure until the parameter is lower than the first pre-selected threshold 201. In an embodiment, the loop module 217 controls operation of the first variable module 213 and the parameter module 215 across the multi-scale Gaussian tree structure 233 until the structural parameter 223 is lower than the first pre-selected threshold 201. At step 508, method 500 computes the second variable 234 using the first variable 211, the sampling matrix 173, a variable selection operator, and the second pre-selected threshold 203. In an embodiment, the second variable module 219 determines the second variable 234, the sampling matrix 173, the variable selection operator, and the second pre-selected threshold 203. At step 510, method 500 computes the coefficient vector 162 using the Hadamard product of the first variable 211 and the second variable 234. In an embodiment, the coefficient module 221 computes the coefficient vector 162.

Figure 6:
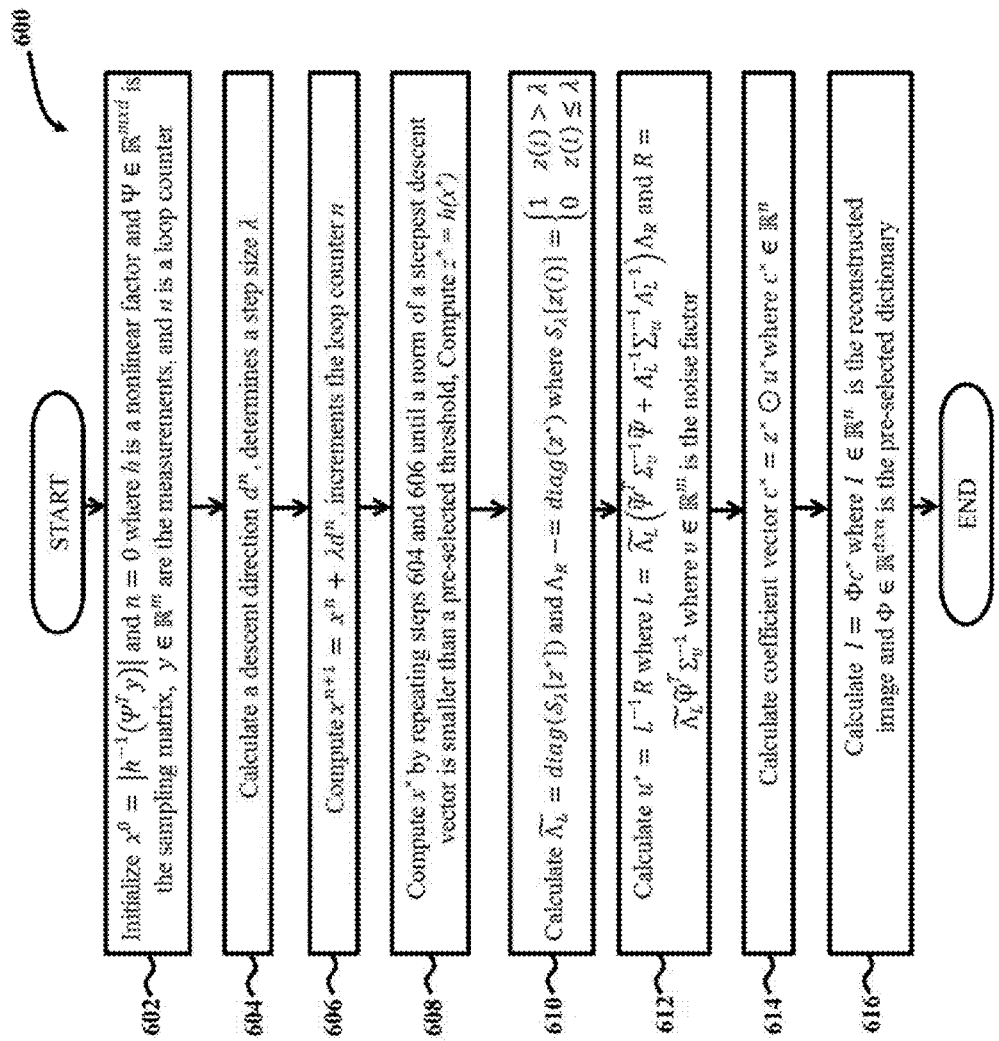
FIG. 6 is a flowchart illustrating a method, according to an embodiment herein.

FIG. 6, with reference to FIGS. 1 through 5, is an embodiment for reconstructing the image of an object, according to an alternative embodiment. At step 602 method 600 initializes $x^0 = |h^{-1}(\Psi^T y)|$ and $n=0$ where h is a nonlinear factor and $\Psi \in \mathbb{R}^{m \times d}$ is the sampling matrix 173, $y \in \mathbb{R}^m$ are the measurements 174, and n is a loop counter. At step 604, method 600 calculates a descent direction $d^n$ and determines a step size $\lambda$. At step 606, method 600 computes $x^{n+1} = x^n + \lambda d^n$ and increments the loop counter n. At step 608, method 600 computes $x^*$ by repeating steps 604 and 606 until a norm of a steepest descent vector is smaller than a pre-selected threshold.

At step 608, method 600 may also compute $z^* = h(x^*)$. At step 610, method 600 calculates $\bar{\Lambda}_L = \text{diag}(S_\lambda[z^*])$ and $\Lambda_R = \text{diag}(z^*)$ where $$S_\lambda[z(i)] = \begin{cases} 1 & z(i) > \lambda \\ 0 & z(i) \leq \lambda \end{cases}.$$

At step 612, method 600 calculates $u^* = L^{-1}R$ where $L = \bar{\Lambda}_L(\tilde{\Psi}^T \Sigma_v^{-1} \tilde{\Psi} + \Lambda_L^{-1} \Sigma_u^{-1} \Lambda_L^{-1}) \Lambda_R$ and $R = \bar{\Lambda}_L \tilde{\Psi}^T \Sigma_v^{-1}$ where $v \in \mathbb{R}^m$ is the noise factor. At step 614, method 600 calculates $c^* = z^* \odot u^*$ where $c^* \in \mathbb{R}^n$ is the coefficient vector. In an embodiment, estimation module 167 performs steps 602 through 614 of method 600.

At step 616, method 600 calculates $I = \Phi c^*$ where $I \in \mathbb{R}^n$ is the reconstructed image and $\Phi \in \mathbb{R}^{d \times n}$ is the pre-selected dictionary 161. The pre-selected dictionary 161 can include at least one class of wavelet dictionaries. The sampling matrix 173 can include a sampling operator determined by a transmitted waveform associated with the measurements 174 and a geometric arrangement of the independent sensors. In an embodiment, reconstruction module 169 reconstructs the image at step 616 of method 600.

Figure 7:
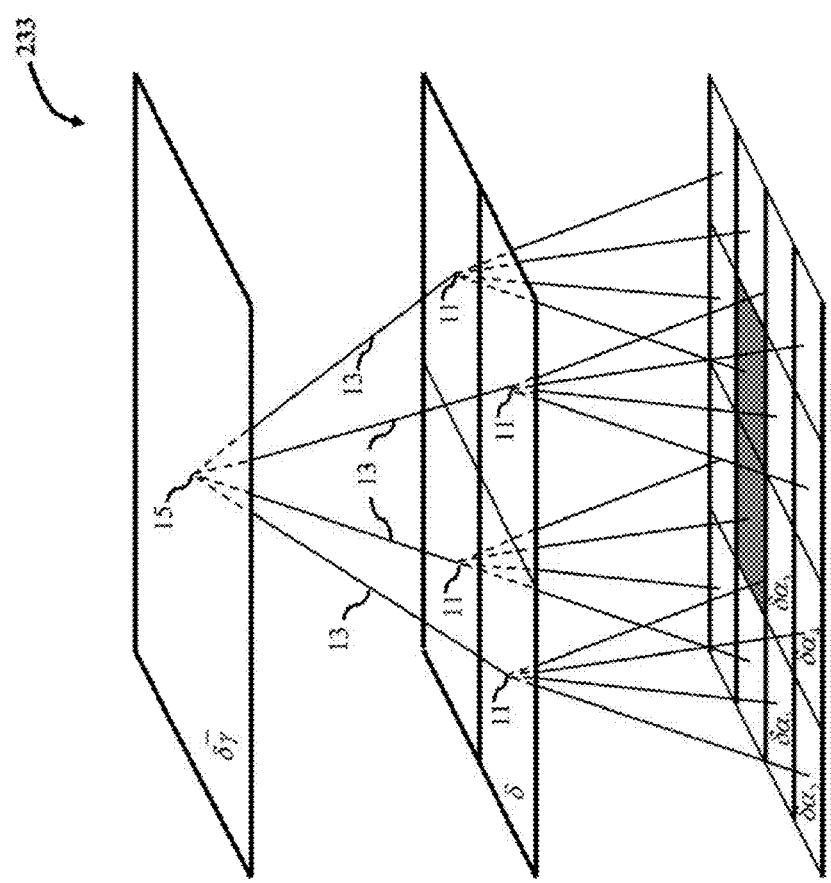
FIG. 7 is a schematic diagram illustrating a quad-tree structure for capturing a non-Gaussian interaction between wavelet coefficients, according to an embodiment herein.

FIG. 7, with reference to FIGS. 1 through 6, is a schematic diagram illustrating the multi-scale Gaussian tree structure 233 according to an embodiment. The multi-scale Gaussian tree structure 233 is based on a quad-tree decomposition of the image space. Each level of the quad-tree decomposition corresponds to a different scale of the wavelet representation of the image wherein each pixel at level i corresponds to d different wavelet coefficients corresponding to that location. For example, when choosing dictionary $\Phi$ to corresponding to orthogonal wavelets each node of the multi-scale Gaussian tree contains a vector of size d=4 corresponding to the familiar LL, LH, HL, HH sub-bands of the wavelet decomposition. In an embodiment herein, for simplicity, a multi-scale tree structure can be defined by the following equations:

$$x(s) = A(s)x(par(s)) + B(s)w(s) \quad (7)$$

$$P_x(s) = A(s)P_x(par(s))A(s)^T + Q(s) \quad (8a)$$

$$P_x(s,t) = \Gamma(s, s\Lambda t) P_x(s\Lambda t) \Gamma^T(t, s\Lambda t) \quad (8b)$$

where, s is node 11 of tree 13 and par(s) refers to the parent 15 of node 11;
$w(s) \sim \mathcal{N}(0,1), Q(s) = B(s)B^T(s)$; the symbol $s\Lambda t$ refers to the closest common ancestor to nodes s and t on a tree; and where $\Gamma$ is a state transition matrix defined recursively as: $\Gamma(s,s) = 1, \Gamma(s,t) = A(s)\Gamma(par(s),t)$. These coarse-to-fine dynamics implicitly define a probabilistic graphical model in which edges between parent-child nodes represent a jointly Gaussian dependency structure.

The statistics of wavelet coefficients can be modeled effectively by the CG model and related observations in sea-clutter and radar images, as shown in Eq. (6). Given Eq. (6) and property (ii), the covariance of a coefficient and its parent is as follows:

$$cov[c(s), c(par(s))] =$$

$$\mathbb{E}[h(x(s))h^T(par(x(s)))] \odot cov[u(s)u^T(par(s))]$$

The fact that the wavelet coefficients of images across scales tend to be decorrelated can be enforced by constraining the Gaussian field u to be corresponding white noise process across the multiscale tree. Furthermore, the variance of the wavelet coefficients across scales follows a self-similar structure. These properties can be accommodated by modeling:

$$u(s) = D(s)\varsigma(s) \quad \varsigma(s) \sim \mathcal{N}(0,1) \text{ such that: } D(s) = 2^{-\gamma m(s)}$$

where, m(s) is the scale corresponding to node s, and $\gamma > 0$ is a constant. From Properties (i)-(iii) it follows that the variance of c is controlled by the u-field.

In spite of the above decorrelation across scales, the strong non-Gaussian local dependence of wavelet coefficients that is observed in natural images is captured by the tree dependency structure in the x (and correspondingly, via (i), the z) random field. Finally as mentioned above, the sparse structure of the wavelet coefficients is enforced by the non-linearity h.

In using the Graphical CG model for the purposes of solving Eq. (1), simplifying assumptions can be made: (1) $A(s)=A \cdot I_d$ and $B(s)=B \cdot I_d \forall s$ where, $A,B \in \mathbb{R}$, and $I_d$ denotes the identity matrix of size d, and (2) the tree structure corresponding to x is homogeneous. From these assumptions, Eq. (7) can be written as:

$$P_x(s) = \frac{B^2}{1-A^2} \quad (9)$$

Letting $A \equiv \mu$ and and $B \equiv \sqrt{1-\mu^2}$, $P_x(s)=I_d \forall s$. Thus, a single parameter $\mu$ controls the inter-scale dependency structure of the wavelet coefficients.

Though many different sparsity-inducing non-linearities h can be incorporated, in an embodiment herein, the following non-linearity can be useful in terms of analytical properties such as smoothness with respect to the sparsity controlling parameter $\alpha$:

$$h(x)=\sqrt{exp(x/\alpha)} \quad (10)$$

Eq. (10) shows that the sparsity level of the signal is inversely proportional to $\alpha$. Thus two parameters, $\alpha$ and $\mu$, control the properties of the Graphical CG distribution.

Given the CG model in Eq. (6), the pdf (probability density function) of the wavelet field c is given by:

$$P(c) = \int \frac{1}{\sqrt{2\pi}|\Sigma|z} \exp(-(c/z)^H \sum^{-1} (c/z))P_z(z) \cdot dz \quad (11)$$

The structure of the CG distribution results from the summation of a continuum of different Gaussians with different scales (variances)—each of which is weighted by the profile $P_z(z)$. Different choices of the weighting profile $P_z(z)$ result in synthesis of different kinds pdfs (each with different kinds of heavy-tailed behavior)—including many of the well-known distributions in statistics, for example, but not limited to, the Laplacian, Generalized Gaussian, and alpha-stable distributions.

A statistical model with prior distribution $\pi(\theta)$ is said to be hierarchical Bayes if it can be decomposed in terms of conditional distributions $\pi(\theta|\theta_1)$, $\pi(\theta_1|\theta_2)$, ..., $\pi(\theta_{t-1}|\theta_{t1})$, and marginal $\pi(\theta_t)$:

$$\pi(\theta)=\int \pi(\theta|\theta_1)\pi(\theta_1|\theta_2) \ldots \pi(\theta_{t-1}|\theta_{t1})\pi(\theta_t). \\ d\theta_1 \ldots d\theta_t \quad (12)$$

The CG distribution inherently has a hierarchical structure in that conditioning on the latent variable z Gaussianizes the wavelet field c. A fully Bayesian non-parametric approach to statistical inference under a hierarchical Bayesian prior model involves drawing samples from the posterior distribution:

$$P(c,z|y) \propto P(c,z)P(y|c)=P(c|z)P(z)P(y|c) \quad (13)$$

via Markov Chain Monte Carlo (MCMC) and other sampling methods. The intermediate estimation of the latent variable, the z-field, is referred to herein as Type-II estimation, whereas the estimation of the primary parameter of interest c is referred to herein as Type-I estimation.

An embodiment focuses on a particular family of prior distributions; i.e., the Graphical CG model described above. The embodiment performs inference by a sequence of MAP estimates starting with the latent variable:

1) Step 1: Perform Type-II MAP estimation problem:

$$z^*=argmax_z \log P(z|y)$$

2) Step 2: Perform Type-I MAP estimation problem conditioned on $z^*$:

$$c^*=argmax_c \log P(c|y,z^*)$$

An embodiment solves the optimization problem presented in Eq. (4) wherein a Graphical CG model is placed on the unknown coefficients c. The first step is to estimate the non-Gaussian component z (Type-II estimation), followed by the estimation of u (Type-I estimation). With respect to Type II estimation, given that $z=h(x)$, it suffices to estimate the Multi-scale Gaussian Tree random process x. This can be performed by recourse to the Bayesian-MAP strategy:

$$x^*=argmax_x \log P(x|y) \quad (14)$$

$$argmax_x \log P(y|x)+\log P(x) \quad (15)$$

From Eq. (1) and Eq. (6):

$$y32\ \tilde{\Psi}(h(x) \odot u)+v \text{ where, } \tilde{\Psi}=\Psi\Phi$$

$$\Rightarrow y=A_xu+v \quad (16)$$

where, $A_x=\tilde{\Psi}H_x$ $$H_x=diag(h(x))$$

From Eq. (16):

$$y|x \sim \mathcal{N}\ (y;0,A_xP_uA_x^T+\Sigma_v)$$

$$x \sim \mathcal{N}\ (x;0,P_x)$$

where, $\mathcal{N}\ (w;\mu,\Sigma)$ denotes a Gaussian with mean $\mu$ and covariance matrix $\Sigma$. Thus Eq. (16) is equivalent to:

$$x^*=argmax_x f(x) \quad (17)$$

where:

$$f(x)=y^T(A_xP_uA_x^T+\Sigma_v)^{-1}y+\log\ det(A_xP_uA_x^T+\Sigma_v)$$

$$+x^TP_x^{-1}x \quad (18)$$

In an embodiment, two types of steepest descent approaches are considered: Gradient and Newton based steepest descent. The Gradient descent involves a first-order Taylor series expansion of the cost function Eq. (18) wherein only the Gradient vector of f has to be computed in each iteration. The Newton descent approach, which involves the second order Taylor approximation of f, in addition entails the calculation of the Hessian matrix. For Newton iterations, once the Hessian is calculated via equation, the closest psd (positive semi-definite) approximation to the Hessian is computed and used for calculating the descent direction as described above. Given a matrix X, an approximation to its closest psd can be calculated as follows:

$$M=QLQ^T \quad (19)$$

where, $L \equiv diag(max(real(\Lambda_x),0))$ $Q \equiv \sqrt{Q_X^T Q_X}$ $\Lambda_X \equiv$ diagonal matrix of eigenvalues of X $Q_X \equiv$ matrix of eigenvectors of X Performing the closest psd approximation of the Hessian matrix $X=\nabla^2 f(x'')$, which effectively constrains the search direction to an elliptical ball defined by the matrix M, furnishes descent directions that can improve upon the gradient direction.

With respect to Type I estimation, let x* be the solution of Eq. (17) obtained via Type II estimation. Thus, the estimate of the non-Gaussian component of the unknown coefficient c is z*=h(x*). The goal of the Type-I estimation is to estimate the corresponding u field. The Bayesian-MAP strategy is used to generate the optimality criterion to solve:

$$u^* = \text{argmax}_u \log P(u|y) \quad (20)$$

$$= \text{argmax}_u \log P(y|u) + \log P(u) \quad (21)$$

$$= \text{argmin}_u (y - A_{x^*}u)^T \Sigma_v^{-1}(y - A_{x^*}u) + u^T P_u^{-1} u \quad (22)$$

Eq. (22) reduces to solving the following equation with respect to u:

$$\Lambda_L(\tilde{\Psi}^T \Sigma_v^{-1} \tilde{\Psi})\Lambda_R u = \Lambda_L \tilde{\Psi}^T \Sigma_v^{-1} y \quad (23)$$

where, $$\Lambda_L = \Lambda_R = diag(z^*)$$

The sparse structure of z* can allow pruning the number of equations to be solved:

$$\tilde{\Lambda}_L (\tilde{\Psi}^T \Sigma_v^{-1} \tilde{\Psi} + \Lambda_L^{-1} \Sigma_u^{-1} \Lambda_L^{-1})\Lambda_R u = \tilde{\Lambda}_L \tilde{\Psi}^T \Sigma_v^{-1} y \quad (24)$$

$$\tilde{\Lambda}_L = diag(S_\lambda[z^*]) \quad (25)$$

$$S_\lambda[z(i)] = \begin{cases} 1 & z(i) > \lambda \\ 0 & z(i) \leq \lambda \end{cases} \quad (26)$$

$S_\lambda$ is a variable selection operator with respect to threshold $\lambda$. The threshold $\lambda$ is determined from the histogram of z*. The resulting Type-I estimation methodology can be summarized as follows:

1. Let z* be the solution of the Type-II estimation procedure given measurements y, sampling matrix $\Psi$, and dictionary $\Phi$
2. Calculate $\tilde{\Lambda}_L = diag(S_\lambda[z^*])$ for a threshold $\lambda$ (in eq. (25)) and let $\Lambda_R = diag(z^*)$
3. Solve for u:

$$u^* = L^{-1} R$$

where, $$L = \tilde{\Lambda}_L (\tilde{\Psi}^T \Sigma_v^{-1} \tilde{\Psi} + \Lambda_L^{-1} \Sigma_u^{-1} \Lambda_L^{-1}) \Lambda_R$$

$$R = \tilde{\Lambda}_L \tilde{\Psi}^T \Sigma_v^{-1}$$

4. Return u*

The matrix $\tilde{\Lambda}_L$ prunes out the rows corresponding to values of the z that are too small (as determined by threshold $\lambda$).

The HB-MAP methodology can be summarized as follows:
1. Initialize parameters
2. Perform Type-II estimation to obtain z*, the MAP estimate of the z field
3. Given z* perform the approximate EM methodology to estimate the optimum parameter $\mu$
4. Iterate between steps (2)-(3) until convergence of $\mu$
5. Perform Type-I estimation to obtain u*
6. Return the optimum estimate of the image: I*=⊙c*, where c*=z*⊙u*

In addition to employing the Type-I and Type-II estimation procedures described above, the HB-MAP methodology also employs an approximate EM methodology that enables the refinement of parameter $\mu$ that controls the non-Gaussian inter-scale dependencies between the wavelet coefficients. Let $\mu_k$ be the value of $\mu$ in the $k^{th}$ iteration, and let $x^*_k$ be the corresponding Type-II MAP estimate that solves (14). A $2^{nd}$ order Taylor expansion of the cost function f about $x^*_k$ can be computed as follows:

$$f(x) \approx f(x^*_k; \mu_k) + [\nabla f(x^*_k; \mu_k)]^T (x - x^*_k)$$

$$+ 0.5(x - x^*_k)^T \{\nabla^2 f(x^*_k; \mu_k)\}^{-1}(x - x^*_k) \quad (27)$$

$$\approx 0.5(x - x^*_k)^T \{\nabla^2 f(x^*_k; \mu_k)\}^{-1}(x - x^*_k) \quad (28)$$

since $\nabla f(x^*_k; \mu_k) = 0$ by definition of the fact that $x^*_k$ is a local optimum point, and $f(x^*_k; \mu_k) \approx 0$ by assumption. Thus $p(x|y, \mu_k) \approx \mathcal{N}(x; x^*_k, \nabla^2 f(x^*_k; \mu_k))$.

The Q-function of the EM methodology is:

$$Q(\mu; \mu_k) = -\mathbb{E}_{p(x|y, \mu_k)}[\log p(x|y, \mu)] \quad (29)$$

$$Q(\mu; \mu_k) = n/2 \log(2\pi) + 1/2 \log \det(P_x(\mu))$$

$$+ 1/2(x^*_k)^T P_x^{-1}(\mu) x^*_k + 1/2 tr(P_x^{-1}(\mu) \nabla^2 f(x^*_k; \mu_k)) \quad (30)$$

and the gradient function of Q is as follows:

$$\nabla_\mu Q(\mu; \mu_k) =$$

$$-1/2(\nabla_\mu P_x(\mu))vec(P_x^{-T}(\mu)) + 1/2(\nabla_\mu P_x(\mu))vec((P_x^{-T}(\mu)) x^*_k (x^*_k)^T P_x^{-T}(\mu)) +$$

$$½(\nabla_\mu P_x(\mu))vec((P_x^{-T}(\mu)) \nabla^2 f(x^*_k; \mu_k) P_x^{-T}(\mu)) \quad (31)$$

The optimum parameter $\mu$ can be found as follows:

$$\mu^* = argmin_\mu Q(\mu; \mu_k) \quad (32)$$

where Eq. (32) can be solved by a simple gradient descent by using the gradient expression given in Eq. (31).

The computationally most intensive part of the methodology is the calculation of the Hessian matrix and (to a lesser extent) the Gradient vector that is required in the steepest descent methodology (Type II estimate). Direct implementation of the Hessian matrix and Gradient vector equations without exploiting the sparse structure of the matrices could be computationally expensive due to the presence of massive tensor products resulting from Kronceker operations on high dimensional matrices. The computational bottleneck can be overcome as follows. The gradient vector is given by the following equation:

$$\nabla f(x) = 2P_x^{-1} x + G_x(\Psi^T \otimes \Psi^T) v_x \quad (33)$$

where, $$G_x = \nabla_x H_x[\{(P_u H_x) \otimes I_n\} + \{I_n \otimes (P_u P_x)\}] \quad (34)$$

$$v_x = vec((M_x^T)^{-1}) - [(M_x^{-1} y) \otimes (M_x^- y)] \quad (35)$$

$$M_x = A_x P_u A_x^T + \sum_v \text{ and } \nabla_x H_x(i,j) = \begin{cases} \frac{\partial h(x_i)}{\partial x_i} & j = i(n+1) - n \\ 0 & \text{else} \end{cases}$$

$$P_x^{-T} = P_x^{-1} \text{ and } M_x^{-T} = M_x^{-1}$$

The following is a procedure for calculating the gradient in Eq. (33).
1. for i=1 to n
2. r=$G_x$(i,:)
3. index=find locations k where r(k)≠0

4. g=0
5. for j=1 to |index|
6. k=index(j), $k_{mod}$=mod(k,n), $k_s$=(k-$k_{mod}$)/n
7. $v_1=\tilde{\Psi}(k_s,:)$  $v_2=\tilde{\Psi}(k_{mod},:)$
8. $g=g+v_x^T vec(v_2 v_1^T)$
9. endfor
10. endfor
11. $g=g+2P_x^{-1}x$
12. Return g The Hessian form can be expressed as follows:

$$\nabla^2 f(x)=2P_x^{-1}x+\Sigma_{i=1}^4 M_i[N_1+N_2]+Q_1+Q_2 \quad (36)$$

where, $$M_1=\nabla^2 H_x[(P_u H_x)\otimes I_{n^2}](\tilde{\Psi}^T \otimes \tilde{\Psi}^T \otimes I_n) \quad (37)$$

$$M_2=\nabla^2 H_x[I_n \otimes (P_u H_x)\otimes I_n](\tilde{\Psi}^T \otimes \tilde{\Psi}^T \otimes I_n) \quad (38)$$

$$M_3=\nabla H_x[I_n \otimes (P_u^T \otimes \tilde{K}_{nn})][I_{n^2}\otimes (\nabla H_x)^T](\tilde{\Psi}^T \otimes \tilde{\Psi}^T \otimes I_n) \quad (39)$$

$$M_4=\nabla H_x(I_n \otimes P_u^T)(\tilde{K}_{nn}\otimes I_n)[I_{n^2}\otimes (\nabla H_x)^T](\tilde{\Psi}^T \otimes \tilde{\Psi}^T \otimes I_n) \quad (40)$$

furthermore, $$N_1=vec(M_x^{-1})\otimes I_n \quad (41)$$

$$N_2=(M_x^{-1}y)\otimes (M_x^{-1}y)\otimes I_n \quad (42)$$

$$Q_1 = -\tilde{G}_x \begin{bmatrix} \{\Psi^T(M_x^{-1}y)(M_x^{-1}y)^T\Psi\} \otimes \\ (\Psi^T M_x^{-1}\Psi) \end{bmatrix} \tilde{G}_x^T \quad (43)$$

$$Q_2 = \tilde{G}_x \begin{bmatrix} K_{nn}\{(\Psi^T M_x^{-1}\Psi) \otimes (\Psi^T(M_x^{-1}y)(M_x^{-1}y)^T\Psi)\} + \\ (\Psi^T(M_x^{-1}y)(M_x^{-1}y)^T\Psi) \otimes (\Psi^T M_x^{-1}\Psi) \end{bmatrix} \tilde{G}_x^T \quad (44)$$

$$\tilde{G}_x = \nabla_x H_x[\{(P_u H_x)\otimes I_n\}+\{I_n \otimes (P_u H_x)\}] \quad (45)$$

A property that can enable efficient calculation of the above matrix products is to preserve sparsity of the intermediate matrices products calculated from left to right. First, by construction the matrices $\nabla H_x$ and $\nabla^2 H_x$ are sparse. Given this, the following Hessian procedure can allow the sparsity of the intermediate matrix products to be preserved while producing the desired matrix products (for example, $M_i N_j \forall i,j$).

1. $\{A_i \in \mathbb{R}^{n_i \times n_{i+1}}\}_{i=1}^k$ are matrices to be multiplied; $n_1$=n
2. for i=1:n
3. r=$A_i$(i,:)
4. for j=1:k
5. r=prod(r,$A_j$)
6. end
7. D(i,:)=devec(r)*vec(N)
8. end
9. Return D where, N is either $N_1$ or $N_2$ (in Eq. (41-42)) and prod( ) refers to specialized matrix products that use algorithmic techniques similar to that in the gradient calculation algorithm.

In terms of flop count, the Gradient calculation takes O(n.S) and the Hessian calculation takes O($n^s$.S) (where integer S depends on matrix $P_u$; for a block-diagonal matrix $P_u$, S is bounded by a small constant) on a single-core CPU (Central Processing Unit). Each of the iterations in the Gradient procedure and the Hessian procedure are independent of each other and thus can be performed in any order. This key property allows for parallel processing to be efficiently exploited in multicore CPU or GPU (Graphical Processing Unit) platforms.

Figure 8:
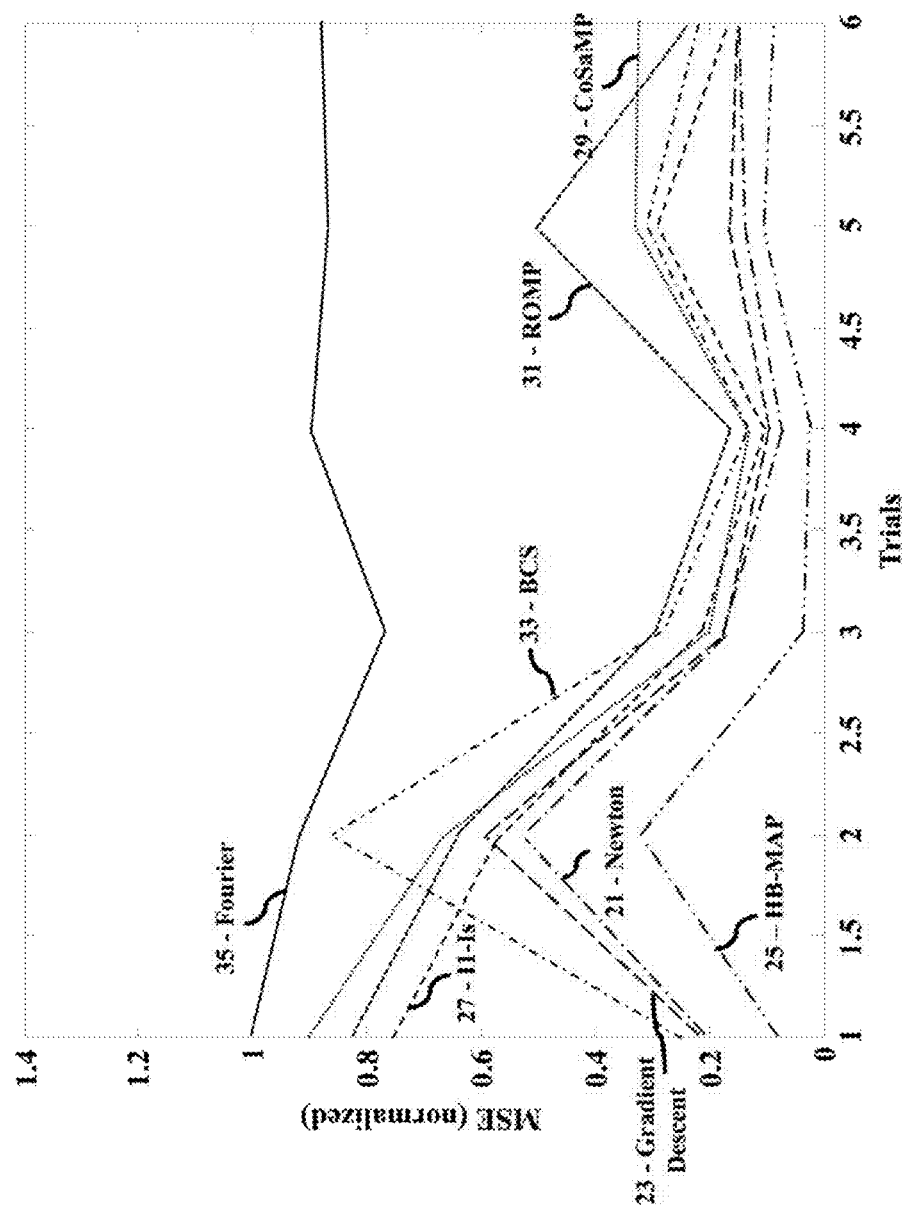
FIG. 8 is a graph illustrating simulation results, according to an embodiment herein.

FIG. 8, with reference to FIGS. 1 through 7, is a graph illustrating performance results for high-sparsity ($\alpha$=0.2) according to an embodiment. Monte Carlo trials in which 16×16 images are reconstructed based on measurements from a Radon transform at eight different uniformly-spaced angles are conducted. Given the received signal, the embodiments herein are used to reconstruct the image which is then compared with the original image. In all the simulations, $\Phi$ is a dictionary of Biorthogonal 1.1 wavelets. Three different versions of the embodiments herein are shown: Newton HB-MAP 21, Gradient HB-MAP 23, and Perfect Knowledge HB-MAP 25. Perfect Knowledge HB-MAP refers to a methodology where perfect knowledge of the z-field is known, which therefore serves as a benchmark for the performance of other methodologies.

Newton 21, Gradient Descent 23, and Perfect Knowledge 25 are performance results from execution of the embodiments herein. Line 23 corresponds to the Gradient descent iteration and line 21 corresponds to the Newton iteration. The simulation results show that the Gradient descent iteration and the Newton iterations both have the maximum MSE at 2 trials. Line 25 illustrates the Perfect Knowledge HB-MAP 25 corresponding to the case where the z-field is known exactly, as in simulated Monte-Carlo trials. Thus, the Perfect Knowledge HB-MAP procedure only applies the Type-I estimation to estimate the image. The performance of Perfect Knowledge HB-MAP is therefore a lower bound which no other methodology can surpass.

The threshold $\lambda$ that is used in the Type-I estimation procedure is determined in these experiments by the coordinate of the histogram of the estimated z field below which 0.1 of the samples is contained. Line 27 corresponding to Il-Is, line 29 corresponding to CoSaMP, line 31 corresponding to ROMP, and line 33 corresponding to BCS illustrate performance results from high sparsity-based convex optimization methodologies. Line 35 corresponding to Fourier illustrates performance results from a standard Fourier-based reconstruction. Simulated images have high-sparsity (i.e. $\alpha$=0.2). The high sparsity case is more typical of natural images. The performance of the embodiments herein exceeds that of other options.

Figure 9:
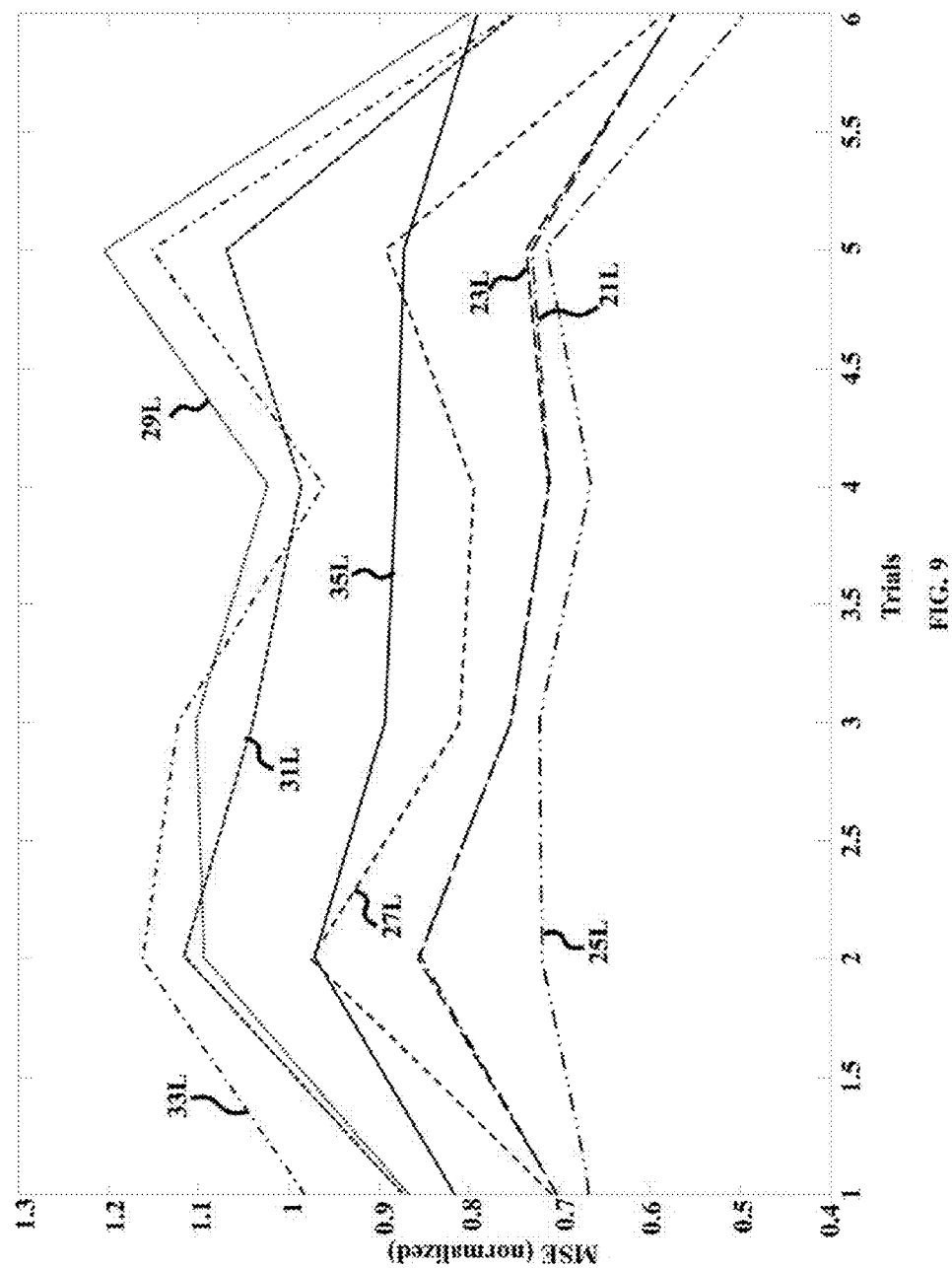
FIG. 9 is a graph illustrating simulation results, according to an embodiment herein.

FIG. 9, with reference to FIGS. 1 through 8, is a graph illustrating simulated performance for 16×16 images with low-sparsity ($\alpha$=1) reconstructed based on measurements from a Radon transform at eight different uniformly-spaced angles, according to an embodiment. Line 21L corresponding to the Newton low, line 23L corresponding to the Gradient Descent low, and line 25L corresponding to the Perfect Knowledge low performance measurements are taken based on execution of the embodiments herein. Il-Is low 27L, CoSaMP low 29L, ROMP low 31L, and BCS low 33L are performance results from sparsity-based convex optimization methodologies. Line 35L corresponding to the Fourier low illustrates performance results from a standard Fourier-based reconstruction. Simulation results illustrates that the Newton HB-MAP low and Gradient HB-MAP low, according to the embodiments describes herein, are among the best perform better than other methodologies. Newton HB-MAP low and Gradient HB-MAP low give identical performance for low-sparsity case.

Figure 10:
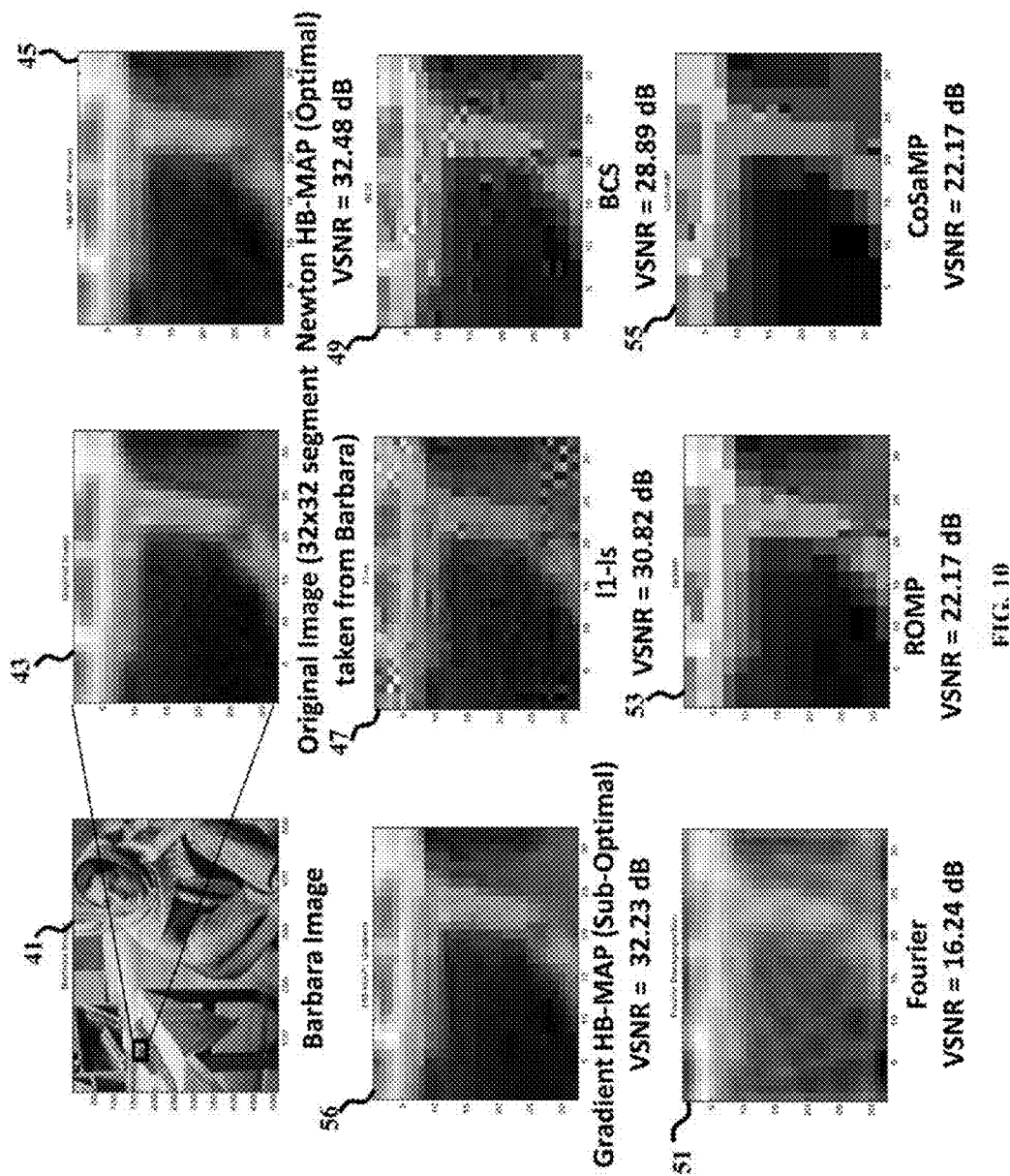
FIG. 10 is set of photographic images, including an original image and several images reconstructed according to an embodiment herein.

FIG. 10, with reference to FIGS. 1 through 9, illustrates an example image processed according to embodiments herein. FIG. 10 illustrates the performance of the Newton HB-MAP algorithm, Gradient HB-MAP, the FBP, and the various CS algorithms when applied to inverting the Radon transform, taken at 15 uniformly spaced angles of a 32×32 segment of the Barbara image—and in which measurement noise is added at each observation channel (sensor). The quality of the reconstruction has been measured using the VSNR quality measure. Image 45 is reconstructed using Newton HB-MAP. Image 51 is reconstructed using Fourier. Image 46 is reconstructed using Gradient HB-MAP. Image 47 is reconstructed using Il-Is. Image 49 is reconstructed using BCS. Image 53 is reconstructed using ROMP. Image 55 is reconstructed using CoSaMP. The images are derived when applied to inverting the Radon transform, taken at fifteen uniformly spaced angles, of a 32×32 segment 43 of Barbara image 41 and in which 60 dB of measurement noise is added at each observation channel (sensor). The quality of the reconstruction has been measured using the VSNR quality measure.

FIG. 10 illustrates that the Newton- and Gradient-HB-MAP algorithms are significantly better than all of the CS algorithms and especially the traditional FBP approach to imaging.

Figure 11:
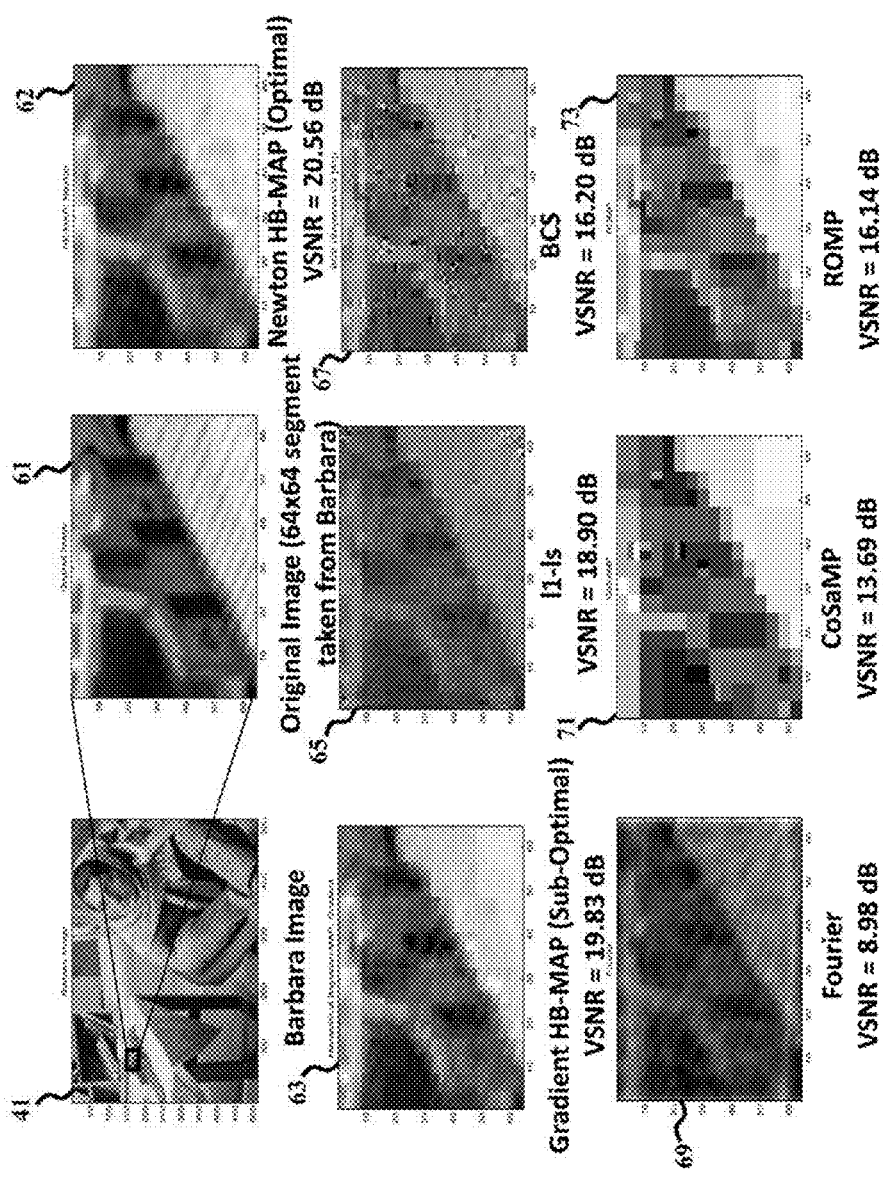
FIG. 11 is a set of photographic images, including an original image and several images reconstructed according to an embodiment herein.

FIG. 11, with reference to FIGS. 1 through 10, illustrates an example image processed according to embodiments herein. FIG. 11 illustrates the performance of the Newton- and Gradient-HB-MAP algorithms when applied to inverting the Radon transform, taken at 15 uniformly spaced angles, of a 64×64 segment of the Barbara image—and, again, in which measurement noise is added at each observation channel (sensor). Image 63 is reconstructed using Gradient HB-MAP methodology when applied to inverting the Radon transform, taken at fifteen uniformly spaced angles, of a 64×64 segment 61 of Barbara image 41 and in which 60 dB of measurement noise is added at each observation channel (sensor). Image 62 is reconstructed using Newton HB-MAP. Image 65 is reconstructed using Il-Is. Image 67 is reconstructed using BCS. Image 69 is reconstructed using Fourier. Image 71 is reconstructed using CoSaMP. Image 73 is reconstructed using ROMP. When compared to other algorithms, both the Newton- and Gradient-HB-MAP outperforms every other CS algorithm and is also once again much better than the standard FBP algorithm. The results in FIG. 10 and FIG. 11 also demonstrate the robustness of the HB-MAP algorithm in noise compared to the prior art.

In an exemplary embodiment, the various modules described herein and illustrated in the figures, for example systems and devices illustrated in FIGS. 1 through 3, are embodied as hardware-enabled modules and may be configured as a plurality of overlapping or independent electronic circuits, devices, and discrete elements packaged onto a circuit board to provide data and signal processing functionality within a special-purpose computer. An example might be a comparator, inverter, or flip-flop, which could include a plurality of transistors and other supporting devices and circuit elements. The modules that are configured with electronic circuits process computer logic instructions capable of providing digital and/or analog signals for performing various functions as described herein. The various functions can further be embodied and physically saved as any of data structures, data paths, data objects, data object models, object files, database components. For example, the data objects could be configured as a digital packet of structured data. The data structures could be configured as any of an array, tuple, map, union, variant, set, graph, tree, node, and an object, which may be stored and retrieved by computer memory and may be managed by processors, compilers, and other computer hardware components. The data paths can be configured as part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be configured as physical locations in computer memory and can be a variable, a data structure, or a function. In the embodiments configured as relational databases (e.g., such Oracle® relational databases), the data objects can be configured as a table or column. Other configurations include specialized objects, distributed objects, object oriented programming objects, and semantic web objects, for example. The data object models can be configured as an application programming interface for creating HyperText Markup Language (HTML) and Extensible Markup Language (XML) electronic documents. The models can be further configured as any of a tree, graph, container, list, map, queue, set, stack, and variations thereof. The data object files are created by compilers and assemblers and contain generated binary code and data for a source file. The database components can include any of tables, indexes, views, stored procedures, and triggers.

Some components of the embodiments herein can include a computer program product configured to include a pre-configured set of instructions stored in non-volatile memory, which when performed, can result in actions as stated in conjunction with the methods described above. For example components of FIG. 1 may include a computer program product. In an embodiment, imaging device 150 may include a computer program. In an embodiment, pre-processor module 156 may include a computer program. In an embodiment, options module 165 may include a computer program. In an embodiment, estimation module 167 may include a computer program. In an embodiment, reconstruction module 169 may include a computer program. In an embodiment, first variable module 213 may include a computer program. In an embodiment, parameter module 215 may include a computer program. In an embodiment, loop module 217 may include a computer program. In an embodiment, second variable module 219 may include a computer program. In an embodiment, coefficient module 221 may include a computer program. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here.

The embodiments herein may also include tangible and/or non-transitory computer-readable storage media for carrying or having computer executable instructions or data structures stored thereon. Such non-transitory computer readable storage media can be any available media that can be accessed by a special purpose computer, including the functional design of any special purpose processor, module, or circuit as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer or special purpose processing device to perform a certain function or group of functions. Computer-executable instructions also include program modules that are executed by computers in stand-alone or network environments. Generally, progran modules include routines, programs, components, data structures, objects, and the functions inherent in the design of special-purpose processors, etc. that perform particular tasks or implement particular abstract data types. Computer executable instructions, associated data structures, and progran modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language, and stored in a computer storage medium (such as a disk, tape physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor, and may be configured, for example, as a kiosk.

The embodiments herein can include both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 12:
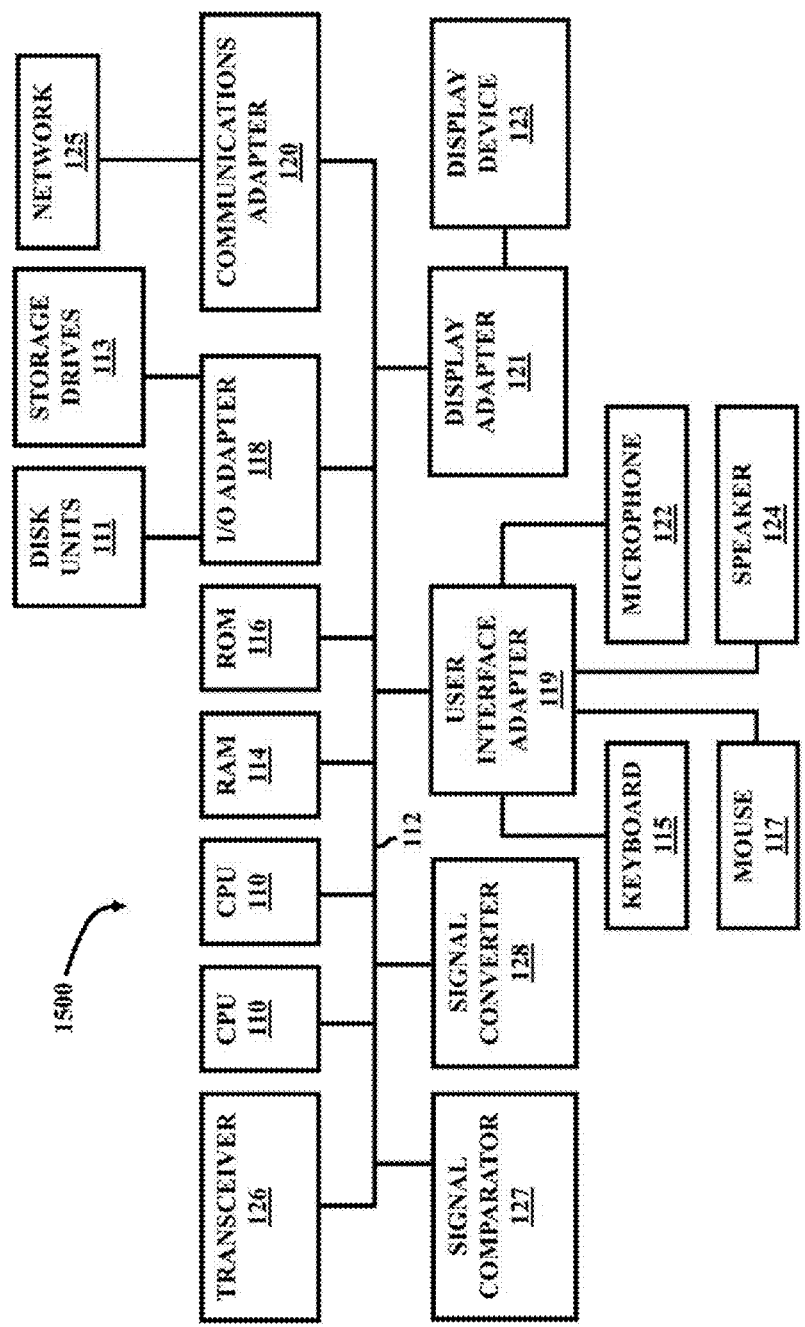
FIG. 12 is a schematic diagram illustrating an exemplary computer architecture used in accordance with the embodiments herein.

A representative hardware environment for practicing the embodiments herein is depicted in FIG. 12, with reference to FIGS. 1 through 11. This schematic drawing illustrates a hardware configuration of an information handling/computer system 1500 in accordance with an exemplary embodiment herein. The system 1500 comprises at least one processor or central processing unit (CPU) 110. The CPUs 110 are interconnected via system bus 112 to various devices such as a random access memory (RAM) 114, read-only memory (ROM) 116, and an input/output (I/O) adapter 118. The I/O adapter 118 can connect to peripheral devices, such as disk units 111 and storage drives 113, or other program storage devices that are readable by the system. The system 1500 can read the inventive instructions on the program storage devices and follow these instructions to execute the methodology of the embodiments herein. The system 1500 further includes a user interface adapter 119 that connects a keyboard 115, mouse 117, speaker 124, microphone 122, and/or other user interface devices such as a touch screen device (not shown) to the bus 112 to gather user input. Additionally, a communication adapter 120 connects the bus 112 to a data processing network 125, and a display adapter 121 connects the bus 112 to a display device 123 which may be embodied as an output device such as a monitor, printer, or transmitter, for example. Further, a transceiver 126, a signal comparator 127, and a signal converter 128 may be connected with the bus 112 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of reconstructing an image of an object, said method comprising:
   determining, by a plurality of sensors, a waveform based on said object, wherein said plurality of sensors view said object from a plurality of directions;
   determining, by a pre-processing module, a plurality of measurements of said object using said waveform, wherein said plurality of measurements are arranged in a vector form;
   determining, by an option module, a sampling matrix, a dictionary, and a noise factor, wherein said sampling matrix represents a geometric arrangement of said plurality of sensors, and said dictionary is pre-selected by said option module;
   estimating, by an estimation module, a coefficient vector using said measurements, said sampling matrix, said noise factor and a global compound Gaussian prior; and
   reconstructing, by a reconstruction module, said image, using said coefficient vector and said dictionary.

2. A method of reconstructing an image of an object, said method comprising:
   determining, by a plurality of sensors, a waveform based on said object, wherein said plurality of sensors view said object from a plurality of directions;
   determining, by a pre-processing module, a plurality of measurements of said object using said waveform, wherein said plurality of measurements are arranged in a vector form;
   determining, by an option module, a sampling matrix, a dictionary, and a noise factor, wherein said sampling matrix represents a geometric arrangement of said plurality of sensors, and said dictionary is pre-selected by said option module;
   estimating, by an estimation module, a coefficient vector using said measurements, said sampling matrix, and said noise factor; and
   reconstructing, by a reconstruction module, said image, using said coefficient vector and said dictionary,
   wherein said estimating said coefficient vector comprises computing, by a first variable module:
   a first variable, using a pre-selected non-linear factor; and
   a multi-scale Gaussian tree structure, using a quad-tree decomposition of said image, said sampling matrix, said dictionary, and said measurements.

3. The method of claim 2, wherein said estimating said coefficient vectors further comprises:
   estimating, by a parameter module, a structural parameter based on a parent-child relationship for each node in said tree structure;
   repeating, by a loop module:
   said computing of said first variable and said multi-scale Gaussian tree structure, and
   said estimating of said structural parameter, across said tree structure, until said structural parameter is lower than a first pre-selected threshold.

4. The method of claim 3, wherein said estimating said coefficient vectors further comprises:
   computing, by a second variable module, a second variable based on said first variable, said sampling matrix, a variable selection operator, and a second pre-selected threshold; and
   computing, by a coefficient module, said coefficient vector based on a Hadamard product of said first variable and said second variable.

5. A method of reconstructing an image of an object, said method comprising:
   determining, by a plurality of sensors, a waveform based on said object, wherein said plurality of sensors view said object from a plurality of directions;
   determining, by a pre-processing module, a plurality of measurements of said object using said waveform, wherein said plurality of measeaents are arranged in a vector form;
   determining, by an option module, a sampling matrix, a dictionary, and a noise factor, wherein said sampling matrix represents a geometric arrangement of said plurality of sensors, and said dictionary is pre-selected by said option module;
   estimating, by an estimation module, a coefficient vector using said measurements, said sampling matrix, and said noise factor: and
   reconstructing, by a reconstruction module, said image, using said coefficient vector and said dictionary, wherein said estimating said coefficient vector comprises:
   initializing, by said estimation module, $x^0 = |h^{-1}(\Psi^T y)|$ and n=0, wherein $x^0$ is an initial approximation of a temporary parameter, h is a nonlinear factor, $\Psi$ is said sampling matrix, y is a vector comprising said measurements, and n is a loop counter;
   calculating, by said estimation module, a descent direction $d^n$;
   determining, by said estimation module, a step size $\lambda$; and
   computing, by said estimation module, $x^{n+1} = x^n + \lambda d^n$, wherein $x^n$ is an $n^{th}$ approximation for said temporary variable and $x^{n+1}$ is an $(n+1)^{th}$ approximation for said temporary variable.

6. The method of claim 5, further comprising:
   incrementing, by said estimation module, said loop counter n;
   computing, by said estimation module, $x^*$, by repeating said calculating said descent direction $d^n$, said determining said step size $\lambda$, said computing $x^{n+1}$, and said incrementing said loop counter n until a norm of a steepest descent vector is smaller than a pre-selected threshold, wherein $x^*$ is a temporary variable.

7. The method of claim 6, further comprising:
   computing, by said estimation module, $z^* = h(x^*)$;
   calculating, by said estimation module, $\bar{\Lambda}_L = \text{diag}(S_\lambda[z^*])$ and $\Lambda_R = \text{diag}(z^*)$, where $$S_\lambda[z(i)] = \begin{cases} 1 & z(i) > \lambda \\ 0 & z(i) \le \lambda \end{cases};$$

calculating, by said estimation module, $u^* = L^{-1} R$ where $L = \bar{\Lambda}_L (\Psi^T \Sigma_v^{-1} \Psi + \Lambda_L^{-1} \Sigma_u^{-1} \Lambda_L^{-1}) \Lambda_R$ and $R = \bar{\Lambda}_L \Psi^T \Sigma_v^{-1}$ where $v \in \mathbb{R}^m$ is said noise factor; and calculating, by said estimation module, $c^*=z^*\odot u^*$ where $c^*\in\mathbb{R}^n$ is said coefficient vector.

8. The method of claim 7, wherein said reconstructing said image further comprises:

calculating, by said reconstruction module, $I=\Phi c^*$ where $I\in\mathbb{R}^n$ is the reconstructed image and $\Phi\in\mathbb{R}^{d\times n}$ is said pre-selected dictionary.

9. The method of claim 8, wherein said plurality of sensors are independent from each other, wherein said dictionary comprises at least one class of wavelet dictionaries, and wherein said sampling matrix comprises a sampling operator determined by a transmitted waveform associated with said measurements and said geometric arrangement of said plurality of sensors.

10. An imaging device comprising:
a plurality of sensors configured to generate a waveform based on an object;
a pre-processor configured to determine a plurality of measurements using said waveform, wherein said plurality of measurements are arranged in a vector form; and
a central imaging device comprising:
an option module configured to determine a sampling matrix, a pre-selected dictionary, a pre-selected non-linear factor, a first pre-selected threshold, a second pre-selected threshold, and a noise factor, wherein option module determines said sampling matrix using a geometric arrangement of said plurality of sensors;
an estimation module configured to estimate a coefficient vector using said plurality of measurements, said sampling matrix, said pre-selected dictionary and a global compound Gaussian prior; and
a reconstruction module configured to reconstruct image of said object, using said coefficient vector and said pre-selected dictionary.

11. An imaging device comprising:
a plurality of sensors configured to generate a waveform based on an object;
a pre-processor configured to determine a plurality of measurements using said waveform, wherein said plurality of measurements are arranged in a vector form; and
a central imaging device comprising:
an option module configured to determine a sampling matrix, a pre-selected dictionary, a pre-selected non-linear factor, a first pre-selected threshold, a second pre-selected threshold, and a noise factor, wherein option module determines said sampling matrix using a geometric arrangement of said plurality of sensors;
an estimation module configured to estimate a coefficient vector using said plurality of measurements, said sampling matrix, and said pre-selected dictionary; and
a reconstruction module configured to reconstruct an image of said object, using said coefficient vector and said pre-selected dictionary, wherein said estimation module further comprises:
a first variable module configured to:
compute a first variable using a pre-selected non-linear factor; and
determine a multi-scale Gaussian tree structure using a quad-tree decomposition of said sampling matrix, said pre-selected dictionary, and said measurements.

12. The device of claim 11, wherein said estimation module further comprises:

a parameter module configured to determine a structural parameter using a parent-child relationship for each node in said multi-scale Gaussian tree structure; and
a loop module configured to control operation of said first variable module and said parameter module across said multi-scale Gaussian tree structure until said structural parameter is lower than said first pre-selected threshold.

13. The device of claim 12, further comprising:
a second variable module configured to determine a second variable using said first variable, said sampling matrix, said variable selection operator and said second pre-selected threshold; and
a coefficient module configured to determine said coefficient vector using a Hadamard product of said first variable and said second variable.

14. An imaging device comprising:
a plurality of sensors configured to generate a waveform based on an object;
a pre-processor configured to determine a plurality of measurements using said waveform, wherein said plurality of measurements are arranged in a vector form; and
a central imaging device comprising:
an option module configured to determine a sampling matrix, a pre-selected dictionary, a pre-selected non-linear factor, a first pre-selected threshold, a second pre-selected threshold, and a noise factor, wherein option module determines said sampling matrix using a geometric arrangement of said plurality of sensors;
an estimation module configured to estimate a coefficient vector using said plurality of measurements, said sampling matrix, and said pre-selected dictionary; and
a reconstruction module configured to reconstruct an image of said object, using said coefficient vector and said pre-selected dictionary, wherein said estimation module is further configured to:
initialize $x^0=|h^{-1}(\Psi^T y)|$ and $n=0$, wherein $x^0$ is an initial approximation of a temporary parameter, h is a non-linear factor, $\Psi$ is said sampling matrix, y is a vector comprising said measurements, and n is a loop counter;
calculate a descent direction $d^n$;
determine a step size $\lambda$; and
compute $x^{n+1}=x^n+\lambda d^n$, wherein $x^n$ is an $n^{th}$ approximation for said temporary variable and $x^{n+1}$ is an $(n+1)^{th}$ approximation for said temporary variable.

15. The device of claim 14, wherein said estimation module is further configured to:
increment said loop counter n; and
compute $x^*$ by repeating said calculating said descent direction $d^n$, said determining said step size $\lambda$, said computing $x^{n+1}$, and said incrementing said loop counter n until a norm of a steepest descent vector is smaller than a pre-selected threshold.

16. The device of claim 15, wherein said estimation module is further configured to:
compute $z^*=h(x^*)$;
calculate $\bar{\Lambda}_L=\text{diag}(S_\lambda[z^*])$ and $\Lambda_R=\text{diag}(z^*)$ where $$S_\lambda[z(i)] = \begin{cases} 1 & z(i) > \lambda \\ 0 & z(i) \leq \lambda \end{cases};$$

calculate $u^* = L^{-1}R$ where $L = \bar{\Lambda}_L (\tilde{\Psi}^T \Sigma_v^{-1} \tilde{\Psi} + \Lambda_L^{-1} \Sigma_u^{-1} \Lambda_L^{-1}) \Lambda_R$ and $R = \bar{\Lambda}_L \tilde{\Psi}^T \Sigma_v^{-1}$ where $v \in \mathbb{R}^m$ is said noise factor; and calculate $c^* = z^* \odot u^*$ where $c^* \in \mathbb{R}^n$ is said coefficient vector.

17. The device of claim 16, wherein said reconstruction module is further configured to reconstruct said image by calculating $I = \Phi c^*$ where $I \in \mathbb{R}^n$ is the reconstructed image and $\Phi \in \mathbb{R}^{d \times n}$ is said pre-selected dictionary.

18. A non transitory program storage device readable by computer, tangibly embodying a program of instructions executable by said computer to perform a method for reconstructing an image of an object, said method comprising:
- determining, by a plurality of sensors, a waveform based on said object, wherein said plurality of sensors view said object from a plurality of directions;
- determining, by a pre-processing module, a plurality of measurements of said object using said waveform, wherein said plurality of measurements are arranged in a vector form;
- determining, by an option module, a sampling matrix, a dictionary, and a noise factor, wherein said sampling matrix represents a geometric arrangement of said plurality of sensors, and said dictionary is pre-selected by said option module;
- estimating, by an estimation module, a coefficient vector using said measurements, said sampling matrix, and said noise factor; and
- reconstructing, by a reconstruction module, said image, using said coefficient vector and said dictionary, wherein said reconstructing said image further comprises using hierarchical Bayesian maximum a posteriori and using a global compound Gaussian model as a statistical prior.

19. A non-transitory program storage device readable by computer, tangibly embodying a program of instructions executable by said computer to perform a method for reconstructing an image of an object, said method comprising:
- determining, by a plurality of sensors, a waveform based on said object, wherein said plurality of sensors view said object from a plurality of directions;
- determining, by a pre-processing module, a plurality of measurements of said object using said waveform, wherein said plurality of measurements are arranged in a vector form:
- determining, by an option module, a sampling matrix, a dictionary, and a noise factor, wherein said sampling matrix represents a geometric arrangement of said plurality of sensors, and said dictionary is pre-selected by said option module;
- estimating, by an estimation module, a coefficient vector using said measurements, said sampling matrix, and said noise factor; and
- reconstructing, by a reconstruction module, said image, using said coefficient vector and said dictionary, wherein said estimating said coefficient vector comprises computing, by a first variable module:
- a first variable, using a pre-selected non-linear factor; and
- a multi-scale Gaussian tree structure, using a quad-tree decomposition of said image, said sampling matrix, said dictionary, and said measurements.

20. The program storage device of claim 19, wherein said estimating said coefficient vectors further comprises:
- estimating, by a parameter module, a structural parameter based on a parent-child relationship for each node in said tree structure;
- repeating, by a loop module:
  - said computing of said first variable and said multi-scale Gaussian tree structure, and
  - said estimating of said structural parameter, across said tree structure, until said structural parameter is lower than a first pre-selected threshold.

21. The program storage device of claim 18, wherein said reconstructing said image further comprises using global compound Gaussian model as a statistical prior.

* * * * *